(12) United States Patent
Welinder et al.

(10) Patent No.: US 10,417,321 B2
(45) Date of Patent: Sep. 17, 2019

(54) LIVE DOCUMENT DETECTION IN A CAPTURED VIDEO STREAM

(71) Applicant: DROPBOX, INC., San Francisco, CA (US)

(72) Inventors: Nils Peter Welinder, San Francisco, CA (US); Peter N. Belhumeur, San Francisco, CA (US); Ying Xiong, Sunnyvale, CA (US); Jongmin Baek, San Jose, CA (US); Simon Kozlov, San Francisco, CA (US); Thomas Berg, San Francisco, CA (US); David J. Kriegman, San Diego, CA (US)

(73) Assignee: DROPBOX, INC., San Francisco, CA (US)

( * ) Notice: Subject to any disclaimer, the term of this patent is extended or adjusted under 35 U.S.C. 154(b) by 0 days.

(21) Appl. No.: 15/658,291

(22) Filed: Jul. 24, 2017

(65) Prior Publication Data
US 2018/0025251 A1 Jan. 25, 2018

Related U.S. Application Data

(60) Provisional application No. 62/365,914, filed on Jul. 22, 2016.

(51) Int. Cl.
*G06T 7/00* (2017.01)
*G06F 17/24* (2006.01)
(Continued)

(52) U.S. Cl.
CPC .............. *G06F 17/24* (2013.01); *G06F 16/93* (2019.01); *G06F 17/212* (2013.01); *G06F 17/2205* (2013.01); *G06F 17/2288* (2013.01); *G06K 9/00456* (2013.01); *G06K 9/00463* (2013.01); *G06K 9/00744* (2013.01); *G06K 9/4604* (2013.01); *G06K 9/78* (2013.01); *G06T 5/007* (2013.01); *G06T 7/194* (2017.01);
(Continued)

(58) Field of Classification Search
None
See application file for complete search history.

(56) References Cited

U.S. PATENT DOCUMENTS 6,671,684 B1 12/2003 Hull et al.
8,832,549 B2 9/2014 Mansfield et al.
(Continued)

OTHER PUBLICATIONS

U.S. Appl. No. 15/658,289, filed Jun. 29, 2018, Office Action.
(Continued)

*Primary Examiner* — Delomia L Gilliard
(74) *Attorney, Agent, or Firm* — Keller Jolley Preece

(57) ABSTRACT

The present disclosure is directed toward systems and methods to quickly and accurately identify boundaries of a displayed document in a live camera image feed, and provide a document boundary indicator within the live camera image feed. For example, systems and methods described herein utilize different display document detection processes in parallel to generate and provide a document boundary indicator that accurately corresponds with a displayed document within a live camera image feed. Thus, a user of the mobile computing device can easily see whether the document identification system has correctly identified the displayed document within the camera viewfinder feed.

20 Claims, 20 Drawing Sheets

(51) Int. Cl.
*G06F 17/21* (2006.01)
*G06T 7/194* (2017.01)
*G06T 11/00* (2006.01)
*G06F 17/22* (2006.01)
*G06K 9/00* (2006.01)
*G06K 9/46* (2006.01)
*G06K 9/78* (2006.01)
*G06T 5/00* (2006.01)
*G06F 16/93* (2019.01)
*G06F 3/0484* (2013.01)

(52) U.S. Cl.
CPC ........ *G06T 11/001* (2013.01); *G06F 3/04842* (2013.01); *G06T 5/002* (2013.01); *G06T 2207/20056* (2013.01); *G06T 2207/20081* (2013.01); *G06T 2207/20084* (2013.01); *G06T 2207/30176* (2013.01); *G06T 2210/22* (2013.01)

(56) References Cited

U.S. PATENT DOCUMENTS

| | | | |
|---|---|---|---|
| 9,105,011 | B2 | 8/2015 | Calman et al. |
| 9,280,691 | B2 | 3/2016 | Kleinman |
| 9,305,402 | B2 | 4/2016 | Bilbrey et al. |
| 2012/0238254 | A1 | 9/2012 | Yankovich et al. |
| 2013/0083003 | A1 | 4/2013 | Perez et al. |
| 2013/0113943 | A1 | 5/2013 | Wormald et al. |
| 2013/0182970 | A1 | 7/2013 | Shustorovich et al. |
| 2014/0072201 | A1 | 3/2014 | Tilt |
| 2014/0297256 | A1 | 10/2014 | Rogowski et al. |
| 2016/0071319 | A1 | 3/2016 | Fallon et al. |
| 2016/0309085 | A1* | 10/2016 | Ilic ................. G06T 3/4038 |
| 2016/0328607 | A1 | 11/2016 | Krishnan |
| 2018/0024974 | A1 | 1/2018 | Welinder et al. |

OTHER PUBLICATIONS

Khan, Z.H.; Aurangzeb, M.; "Real Time Object Tracking Using BMA"; Source: First International Conference on Information and Communication Technologies, 2005; Print ISBN: 0-7803-9421-6; DOI: 10.1109/ICICT.2005.1598555.

Kim, J.; Seitz, S.; Agrawala, M.; "Video-based document tracking: Unifying your physical and electronic desktops"; Source: UIST: Proceedings of the Annual ACM symposium on User interface Software and Technology, 2004.

Porzik, L.; Ricci, E.; Ciarfuglia, T.; Zanin, M.; "Visual-inertial tracking on Android for Augmented Reality applications"; Source: 2012 IEEE Workshop on Environmental Energy and Structural Monitoring Systems; Electronic ISBN: 978-1-4673-2738-1; DOI: 10.1109/EESMS.2012.6348402.

U.S. Appl. No. 15/658,289, dated Jan. 28, 2019, Office Action.
U.S. Appl. No. 15/658,289, dated Jun. 25, 2019, Office Action.

* cited by examiner

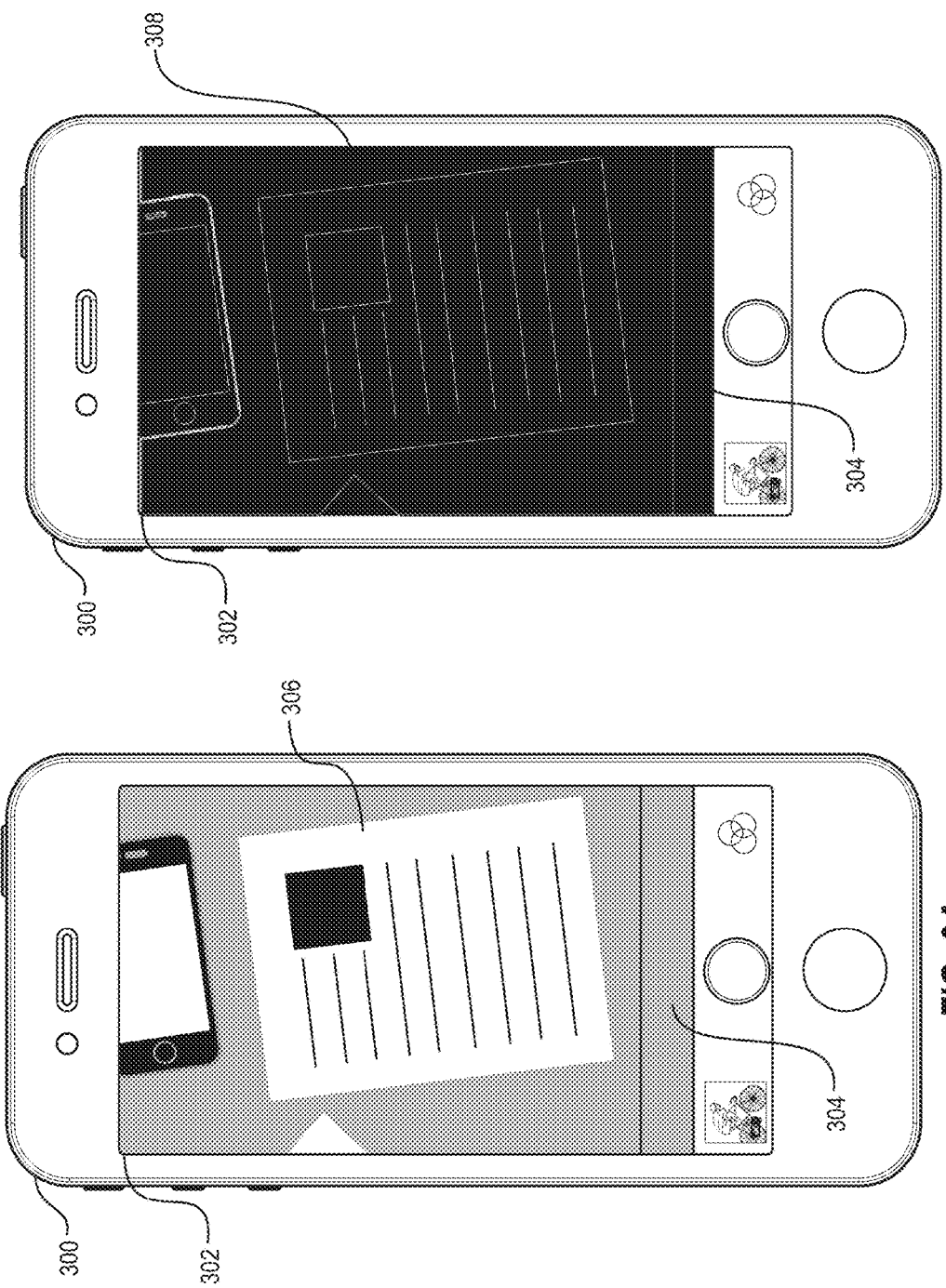

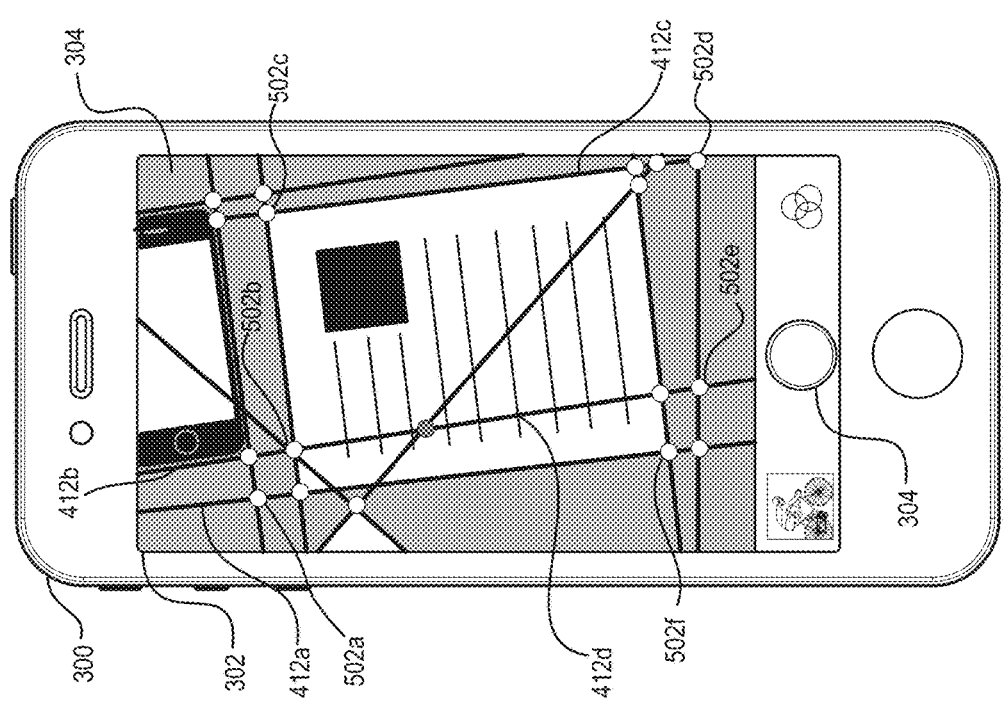

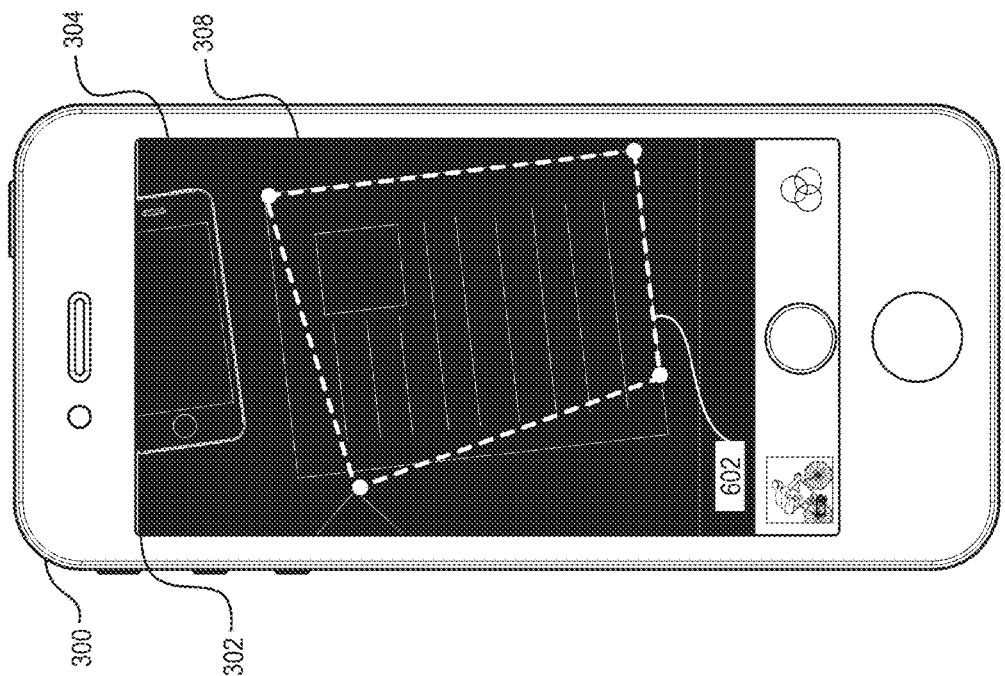
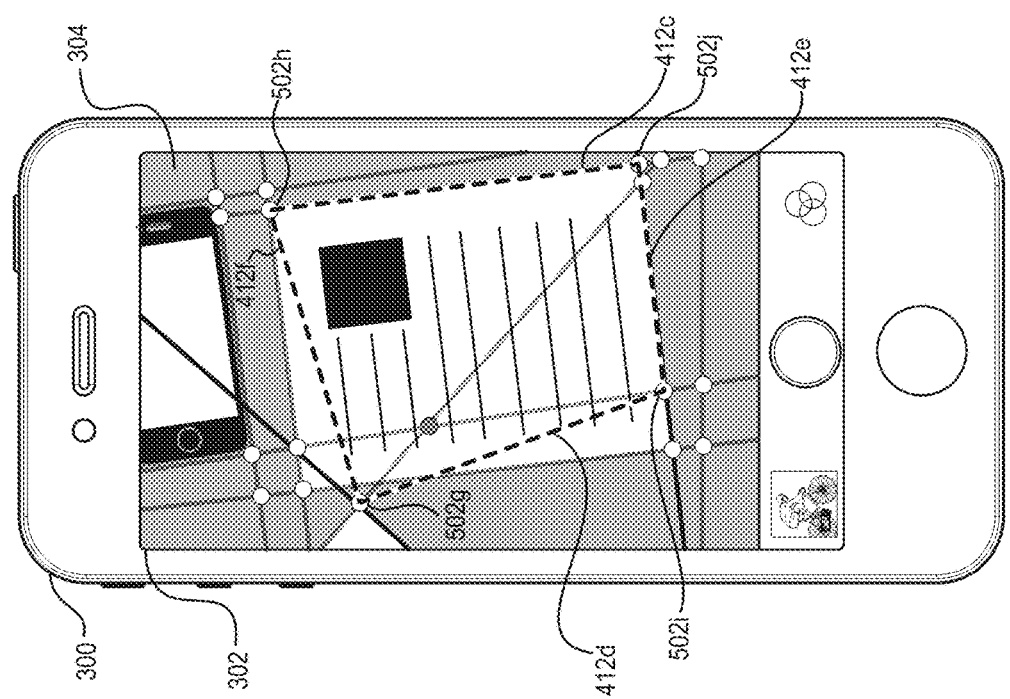
FIG. 6D
FIG. 6C

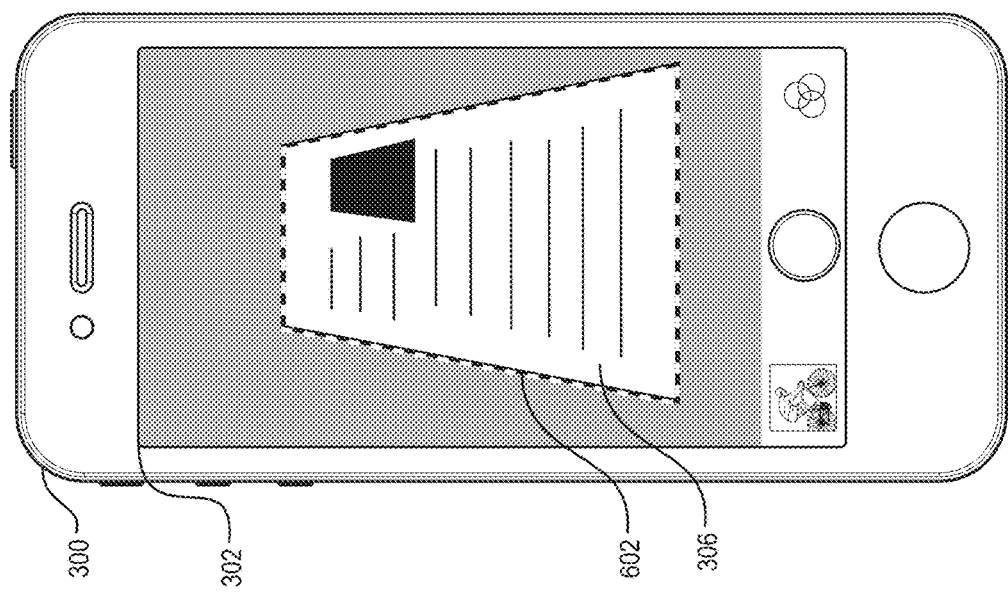

LIVE DOCUMENT DETECTION IN A CAPTURED VIDEO STREAM

CROSS REFERENCE TO RELATED APPLICATIONS

This application claims the benefit of and priority to U.S. Provisional Application No. 62/365,914, filed Jul. 22, 2016, the entire contents of which are hereby incorporated by reference.

BACKGROUND

Online or "cloud" storage is a popular and easy way for computer users to store electronic media without the need to physically connect to a storage device. For example, it is common for a user to capture digital photographs and videos on a smart phone, and to store the captured media items in the "cloud." Furthermore, users frequently utilize online storage for storing more than digital photographs and videos. For instance, users often utilize online storage to save electronic document files (e.g., word processor files, spreadsheet files, and/or other electronic files).

In addition to saving digital photos, digital videos, and electronic document files to online storage, in many cases a user wishes to save physical documents (e.g., paper receipts, invoices, pay stubs, bills, reports, and so forth) to online storage. Unlike digital photographs, videos, and other electronic files that are in a digital format, in order to eventually save a physical document to online storage, the physical document must first be digitized (i.e., changed from a physical object to digital data. Conventional systems have several disadvantages when attempting to digitize a physical document to save on an online storage system.

One disadvantage is that conventional systems often need multiple steps and various hardware devices. To illustrate, in some conventional systems, a user utilizes a flatbed scanner to digitize a physical document. Conventional systems that use a flatbed scanner have several disadvantages. First, in utilizing a flatbed scanner, the user often must store physical documents until being able to access a flatbed scanner (e.g., at an office). Furthermore, the user has to scan the physical documents, save the scanned document to the user's local computer device, and then upload the scanned document to online storage. The flatbed process of scanning, saving, and uploading documents is frustrating for users.

Due to the disadvantages of using a flatbed scanner, some users take a digital photo of a physical document they wish to store digitally, and upload the digital photo to online storage. Various problems exist, however, with this conventional approach to storing physical documents. For example, a digital photo in a picture file format (e.g., JPEG, GIF) is typically a much larger data file compared to file formats for electronic documents. Thus, physical documents that are digitized in a picture file format use excessive storage resources that can result in limited available storage space. Moreover, because larger data files take longer to download from an online storage system, storing physical documents in a picture file format typically results in longer file access times (e.g., the amount of time for a client device to access a file on the online storage). In addition, picture file formats are often not compatible with document applications within which the physical document is intended to be used, such as accounting applications, electronic document applications, and so forth.

While some conventional systems are able to convert a digital photo to a document file format, traditional file converters use significant amounts of processor resources to make the conversion. Due to the significant use of processor resources, many file converters need more processor power than is available on a typical mobile device. Due to the processor, intensive process of converting a digital photo in a picture file format to a document file format, a user must first download a digital photo of the physical document to a non-mobile computing device (e.g., desktop or laptop computer) that has adequate processor power. Thus, conventional file conversion systems often require significant processing resources not available on many mobile devices.

As another disadvantage, conventional systems that save a digital photo of a physical document often result in poor quality representation of the physical document. For example, when taking a photo of a physical document with a mobile phone camera, a user often holds the camera at an angle with respect to the physical document. Thus, the document in the resulting photo appears skewed. In addition, with conventional systems, the user may hold the camera too close to the physical document or too far away from the physical document, which may result in not capturing portions of a physical document, or capturing portions of a physical document that are unreadable.

Furthermore, conventional systems are unable to provide a user with any visual guidance to capture a physical document because most digital cameras (e.g., on mobile devices) generate a viewfinder image feed having a frame rate that is much too fast for conventional systems to usefully recognize a physical document within the image feed. Specifically, conventional systems require significant processor time and resources to detect an object within an image. Accordingly, by the time a conventional system may be able to detect a physical document within a frame of a viewfinder image feed, the viewfinder image feed is displaying a much different frame (e.g., 20 or more frames after the display of the analyzed frame). Therefore, due to the complexity and processor intensive object detection process of conventional systems, any document detection on a frame within a viewfinder image feed is irrelevant and not useful with respect to a currently displayed image frame within the viewfinder image feed.

SUMMARY

One or more embodiments of the present disclosure provide benefits and/or solve one or more of the foregoing or other problems in the art by providing systems and methods to quickly and accurately identify boundaries of a displayed document in a camera's image feed, and provide a document boundary indicator within the camera's image feed. For example, systems and methods described herein utilize different display document detection processes in parallel to generate and provide the document boundary indicator to accurately correspond with the displayed document within a live camera image feed.

In at least one embodiment, systems and methods use first robust process to search an entire image frame for a boundary of a displayed document (e.g., the perimeter of a displayed document). Additionally, for example, systems and methods use a second iterative process to predict an updated boundary location of the displayed document with respect to a location of the boundary in a previous image frame. By combining the results of the first robust process and the second iterative process, example embodiments of the described systems and methods visually identify the boundary of a displayed document within a live camera image feed with little to no lag with respect to the frame rate of the live camera image feed.

Additional features and advantages of the present invention will be set forth in the description that follows, and in part will be obvious from the description, or may be learned by the practice of the various embodiments described. The features and advantages of such embodiments may be realized and obtained by means of the instruments and combinations particularly pointed out in the appended claims. These and other features will become more fully apparent from the following description and appended claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which:

FIGS. 3A-3B illustrate a process for identifying one or more edges within an image frame in accordance with one or more embodiments described herein;

FIGS. 5A-5D illustrate a process for identifying one or more corners within an edge map in accordance with one or more embodiments described herein;

FIGS. 6A-6G illustrate a process for identifying one or more quadrilaterals within an edge map in accordance with one or more embodiments described herein;

DETAILED DESCRIPTION

Figure 1:
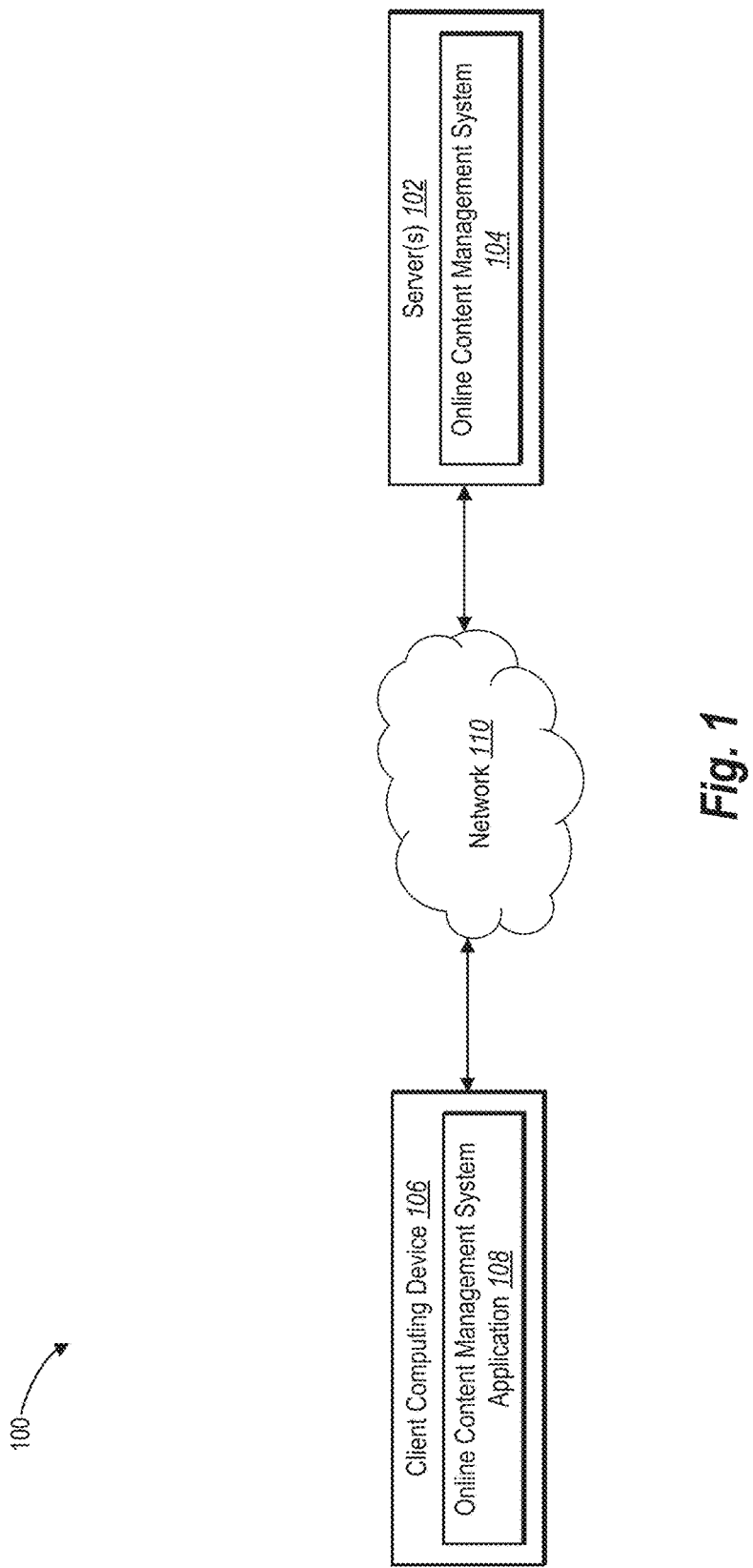
FIG. 1 illustrates a schematic diagram of an environment for implementing the document identification system in accordance with one or more embodiments described herein.

One or more embodiments of the present disclosure provides a document identification system that determines a boundary of a displayed document in an image feed (e.g., digital camera feed on a mobile device), and provides a boundary indicator corresponding to the boundary of the displayed document within the image feed. For example, in one embodiment, document identification system generates and provides a document boundary indicator outlining the boundaries of a displayed document in an image feed. For instance, the document identification system can provide a document boundary indicator overlaid on an image feed within an online content management system application on a mobile computing device. Thus, the user of a mobile computing device can easily see whether the document identification system has correctly identified the displayed document within the camera viewfinder feed.

In one or more embodiments, the document identification system utilizes multiple processes in parallel to identify the boundary of the displayed document within the live image feed. For example, the document identification system receives successive image frames from an image feed to identify a displayed document therein. The image identification system performs a first robust process on a first image frame to accurately determine a location of the displayed document within the first image frame. In some examples, based on the determined location of the displayed document in the first image frame, and using on one or more signals from the mobile device (e.g., device movement signals from a gyroscope and/or accelerometer), the image identification system performs a second iterative process to predict an updated location of the displayed document within one or more image frames that sequentially follow the first image frame in the image feed. In one or more embodiments, the first robust process and the second iterative process are performed in parallel to provide an indication of the displayed document within the image feed.

As mentioned above, in some examples, the document identification system uses a robust process to identify a location of a displayed document within an image frame from an image feed. In some embodiments, and as part of the robust process, the document identification system can detect edges within the image frame. For example, in at least one embodiment, document identification system detects all edges within the image frame (e.g., curved or straight), and then determines which of the detected edges are straight lines. Based upon determining the straight lines within the image frame, the document identification system can also identify one or more corners based on determine an intersection of at least two straight lines.

Furthermore, using the identified straight lines and corners, some embodiments of the document identification system identify quadrilaterals formed by the straight lines and corners in the image frame. For example, in one or more embodiments, the document identification system identifies all quadrilaterals within the image frame formed by the straight lines and corners. In some embodiments, the document identification system also identifies a potential quadrilateral in a digital image even when all of the corners of the potential quadrilateral are not shown in the image frame. Accordingly, the document identification system can predict and infer the presence of a quadrilateral (and thus a displayed document) when one or more corners of a quadrilateral are outside a viewable area of the image frame.

Upon identifying quadrilaterals within the image frame, the document identification system can calculate a score for each quadrilateral within the image frame. For example, based on one or more characteristics associated with each quadrilateral, the document identification system can generate a score to represent a likelihood that a particular quadrilateral represents the boundary of a displayed document in the image frame. Accordingly, based on the quadrilateral that most likely corresponds to the boundary of a displayed document, the document identification system generates a document boundary indicator associated with the displayed document to present in conjunction with the image frame within the image feed (e.g., within a camera viewfinder image feed on a display of a mobile device).

As mentioned above, in addition to identifying a display document boundary within an image frame using a robust process, the document identification system can utilize an integrative process in parallel with the robust process to predict updated boundary locations within subsequent image frames. In one embodiment, the document identification system can utilize the location of the displayed document boundary from the robust process in combination with various signals from the mobile device to predict an updated location of the displayed document boundary in one or more subsequent image frames from the image feed. In some examples, the iterative process can explicitly look for the document shape identified from the robust process and/or integrate a signal from the device (e.g., gyroscope and/or accelerometer) to generate a fast intra-frame boundary tracking.

In some embodiments, a robust process is a slower process (e.g., more processing time) than an iterative process. With that said, however, in some examples a robust process can directly detect a boundary of a displayed document within an image frame, while an iterative process predicts a boundary of a displayed document within an image frame based on a past boundary location and one or more signals from a mobile device (e.g., device location and movement signals). Using a combination of a robust process and an iterative process in parallel, the document identification system can provide a seamless display of a boundary indicator of a displayed document within an image feed.

The above-described functions and features of a document identification system, as well as the additional details below, provide several advantages over conventional systems. For example, when compared to conventional systems that often result in a poor representation of a physical document, the document identification system intuitively and efficiently provides a visual indication of the physical document within a camera's image feed. The visual indication provides user guidance that allows a user to easily position the camera to capture a quality image of the physical document. For instance, the visual guidance allows a user to position the camera to avoid: a camera angle that skews the document within the image; a camera position too close to the physical document that portions of the physical document are cutoff; and a camera position too far from the physical document that the text of the document becomes unreadable.

In addition, the document identification system reduces the amount computing resources needed to provide a visual indicator of a displayed document within a live image feed. For example, conventional systems require an amount of computing resources and processing time that provides results much slower than a frame rate of most, if not all, camera image feeds. In contrast, one or more embodiments of the document identification system reduces the amount of processing resources needed to identify a displayed document and generate a visual indication of a displayed document. Indeed, due to the decrease in computing resources, the document identification system can provide a document boundary indicator in conjunction with a presentation of a camera image feed, and provide the document boundary indicator at a rate that reduces or eliminates lag between the presentation of the document boundary indicator and the frame rate of the image feed.

This disclosure refers to various terms to describe the functions and features of one or more embodiments of a document identification system. As used herein, a "physical document" refers to a real-world object used to convey information. For instance, a physical document can include real-word objects that include printed text, handwritten text, drawings, figures, diagrams, or other forms of information. Various examples of physical documents include paper-type documents such as a piece of paper, a receipt, a pamphlet, a book page, a notepad, a menu, an envelope, a holiday card, a business card, etc. Physical documents further can include a whiteboard, chalkboard, or other types of writing surfaces. In yet other examples, a physical document can include an image of a computer monitor, television screen, projector display, or other presentation mediums. As is appreciated based on the disclosure herein, other examples of physical documents exist that benefit from the systems and method described herein.

As used herein the term "displayed document" refers to a depiction of a physical document within a digital image. For example, a displayed document can include a visual representation of a physical document within an image frame of an image feed, or within an image feed itself (e.g., a camera viewfinder image feed). In addition, a displayed document can include a representation of a physical document within a captured digital photo (e.g., a digital photo that the document identification system converts to a document file). In some embodiments, a displayed document does not include an entire physical document, but rather only includes a portion of a physical document. Accordingly, and in general, a displayed document includes a visual digital depiction of at least a portion of a physical document.

As also used herein, a "boundary," "boundary of a displayed document," and/or "displayed document boundary" refers to a perimeter, or a portion of a perimeter, of a displayed document. For example, a displayed document boundary can include the four edges of a displayed document depicting a standard sheet of paper. Moreover, a displayed document boundary does not have to include the entire perimeter of a physical document because, as stated above, a displayed document may only capture a portion of a physical document. Accordingly, in some cases, a displayed document boundary does not include all sides of a physical document and/or does not include all corners of a physical document, depending on the displayed document within an image frame.

FIG. 1 is a schematic diagram illustrating an example embodiment of a communication environment 100. As illustrated in FIG. 1, communication environment 100 includes server 102 supporting an online content management system 104. Furthermore, communication environment 100 includes a mobile computing device 106 on which an online content management system application 108 is installed. In at least one embodiment, mobile computing device 106 and server 102 are communicatively coupled across network 110. Although FIG. 1 illustrates a particular arrangement of mobile computing device 106, server 102, and network 110, various other arrangements are possible. For example, mobile computing device 106 may directly communicate with server 102, bypassing network 110. Additionally, in one or more embodiments, mobile computing device 106 may not include online content management system application 108, but rather may utilize the features of communication environment 100 via a native application or a web application.

Mobile computing device 106 and server 102 may communicate using any communication platform or technology suitable for transporting data and/or communication signals. For example, mobile computing device 106 and server 102 may incorporate various communication technologies, devices, media, and protocols, examples of which are described below with respect to FIGS. 10 and 11.

In addition, in certain embodiments, mobile computing device 106 may communicate via network 110 with server 102, which may include one or more networks as described below with respect to FIG. 11. Network 110 may represent a network or collection of networks (such as the Internet, a corporate intranet, a virtual private network ("VPN"), a local area network ("LAN"), a wireless local area network ("WLAN"), a cellular network, a wide area network ("WAN"), a metropolitan area network ("MAN"), or a combination of two or more such networks. Thus, network 110 may be any suitable network over which mobile computing device 106 and server 102 may communicate. Network 110 is discussed in more detail below with regard to FIG. 11.

As shown in FIG. 1, server 102 includes online content management system 104. In one or more embodiments, online content management system 104 provides digital content storage to users. For example, a user with an account associated with online content management system 104 can upload digital files (e.g., digital photographs, digital videos, PDF files, word processing files, etc.) to online content management system 104. Generally, online content management system 104 organizes and stores the uploaded files for the user's later viewing and possible download.

Also, as shown in FIG. 1, mobile computing device 106 includes online content management system application 108. In one or more embodiments, online content management system application 108 provides a user with one or more graphical user interfaces that enable the user to navigate and interact with communication environment 100 as well as with online content management system 104. For example, online content management system application 108 can provide one or more interactive graphical user interfaces on a display of mobile computing device 106 that enable the user to upload files, view files, share files, download files, and so forth.

In at least one embodiment, online content management system application 108 interfaces with a camera associated with mobile computing device 106 in order to capture digital content (e.g., digital photographs). In particular, online content management system application 108 can interface with a camera to receive an image feed from the camera that includes a displayed document. As will be explained in detail below, online content management system application 108 and online content management system 104 can alone, or in combination, identify a displayed document within an image feed, identify a displayed document boundary corresponding to the displayed document, and generate a document boundary indicator for presentation in conjunction with presentation of the image feed on the mobile device. In addition, online content management system application 108 and online content management system 104 can capture a displayed document within a digital photo, convert the captured document into an electronic document format, and save or otherwise store the electronic document version of the captured document within the online content management system 104.

As used herein, an "image feed" includes a feed of digital image frames for presentation on a screen or monitor of a computing device. For instance, an image feed can include a feed from a digital camera of a computing device. In other examples, an image feed can include a previously captured feed. In addition, in some embodiments the image feed can include streaming video, a presentation of saved video, or other digital content that includes a presentation of a series of multiple image frames. An image feed can have various frame rates, or in other words, the rate at which image frames are displayed upon presentation of an image feed. As is understood based on this disclosure, an "image frame," as used herein, is a defined portion or instance of digital content included within an image feed. For example, an image feed generally includes multiple successive image frames that, when presented in succession, can present a video-type presentation.

Figure 2:
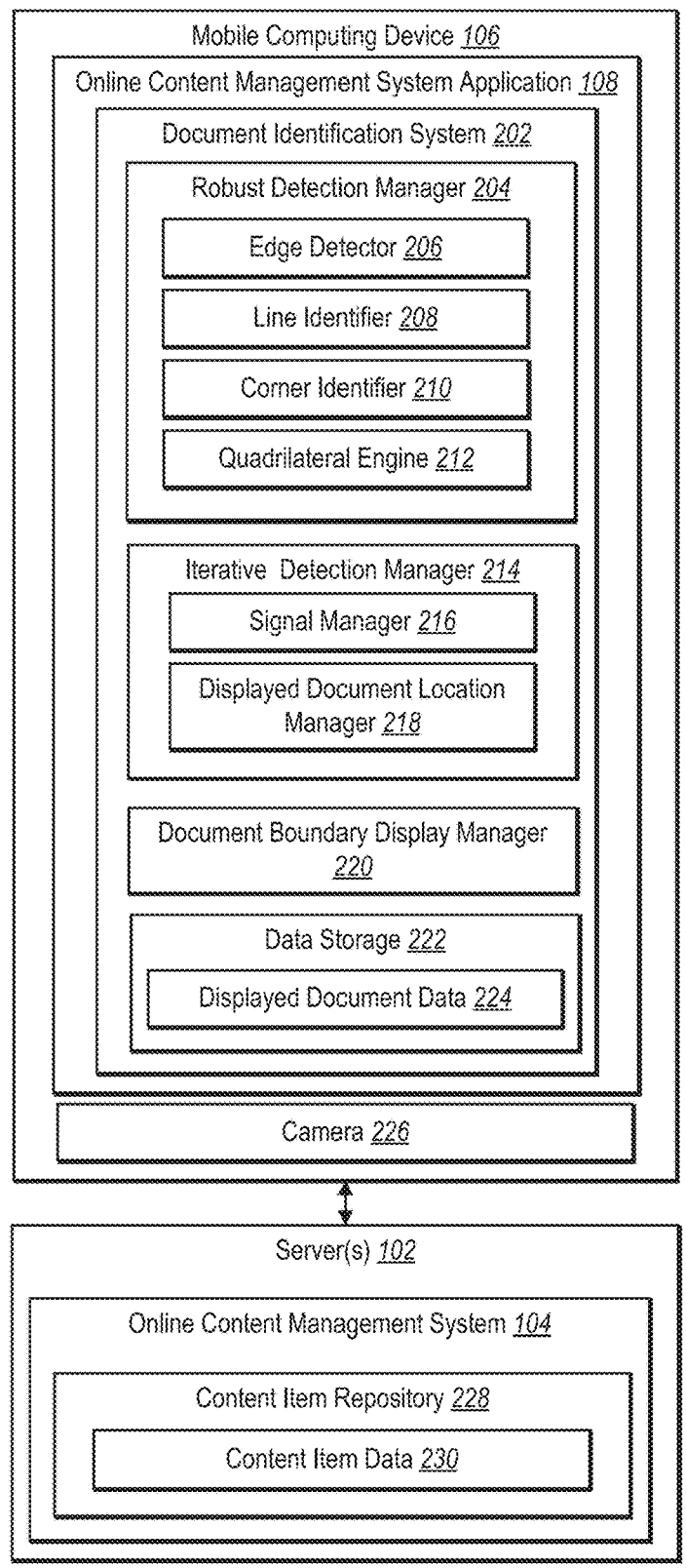
FIG. 2 illustrates a schematic diagram of the document identification system in accordance with one or more embodiments described herein.

FIG. 2 illustrates an example embodiment in which mobile computing device 106 is in communication with server 102. As shown, mobile computing device 106 includes a camera 226. In addition, mobile computing device 106 includes online content management system application 108, which in turn includes document identification system 202. Although FIG. 2 shows document identification system 202 as part of online content management system application 108, portions of document identification system 202 can also be part of online content management system 104 on server 102.

In one or more embodiments, as shown in FIG. 2, document identification system 202 includes a robust detection manager 204, an iterative detection manager 214, a document boundary display manager 220, and a data storage 222 storing displayed document data 224. In at least one embodiment, robust detection manager 204 includes an edge detector 206, a line identifier 208, a corner identifier 210, and a quadrilateral engine 212. Moreover, in at least one embodiment, iterative detection manager 214 includes a signal manager 216, and a displayed document location manager 218.

Components 104, 108, and 202-230 can comprise software, hardware, or both. For example, components 104, 108, and 202-230 can comprise one or more computer-executable instructions stored on a computer readable storage medium and executable by one or more processors of one or more computing devices. When executed by the one or more processors, the one or more computer-executable instructions of communication environment 100 can cause a computing device(s) to perform the features and methods described herein. Alternatively, components 104, 108, and 202-230 can comprise a special purpose processing device to perform a certain function or group of functions. Additionally, or alternatively, components 104, 108, and 202-230 can comprise a combination of computer-executable instructions and hardware.

As mentioned above, and as shown in FIG. 2, document identification system 202 (or simply "system 202") includes robust detection manager 204. In one or more embodiments, robust detection manager 204 performs a robust detection process that searches an image frame (e.g., an entire area of an image frame) for a displayed document. As used herein, a robust detection process refers to a process wherein document identification system 202 analyzes an image frame to directly identify a displayed document. In some embodiments, the robust detection process does not utilize iterative data, but rather begins the displayed document identification process from anew for an image frame within an image feed.

In one or more embodiments, robust detection manager 204 performs the robust detection process in combination with a single image frame from an image feed. For example, in response to system 202 receiving an image feed from camera 226 of mobile computing device 106, robust detection manager 204 can extract a single image frame from the image feed in order to identify a displayed document within the single image frame. In at least one embodiment, the robust detection process includes one or more of the following processes: edge detection, line identification, corner identification, and quadrilateral identification. In one or more embodiments, these processes are performed by edge detector 206, line identifier 208, corner identifier 210, and quadrilateral engine 212, respectively.

As shown in FIG. 2, robust detection manager 204 includes edge detector 206. In one or more embodiments, edge detector 206 utilizes one of various techniques in order to identify all edges within an image frame. For example, in one embodiment edge detector 206 utilizes the Canny edge detection technique, or a variant of the Canny edge detection technique in order to identify all edges within the image frame. In one or more embodiments, the Canny edge detection technique includes: applying a Gaussian filter to smooth the image frame, finding the intensity gradients of the image frame, applying non-maximum suppression to get rid of spurious response to edge detection, applying a double threshold to determine potential edges, and tracking edges by hysteresis thereby suppressing edges in the image frame that are weak and not connected to strong edges.

Alternatively or additionally, edge detector 206 identifies edges within the image frame by utilizing a machine learning-based edge detection technique. An example of such a machine learning-based edge detection technique utilized by edge detector 206 is based on a Structured Edge Detector algorithm. For example, in at least one embodiment, a machine learning-based edge detector is a machine model explicitly trained (e.g., by edge detector 206 or by another entity) to find object boundaries (e.g., in this case document boundaries), and to suppress less important details such as texture and text.

To illustrate, in one embodiment, human annotators train the machine learning-based edge detector by identifying edges or boundaries in each image frame of a set of training image frames. The human annotators then utilize the annotated training dataset to train a model to identify edges or boundaries in unannotated input image frames. Thus, the resulting trained model is able to predict how likely it is that each pixel in an image frame belongs to an object boundary (e.g., displayed document boundary).

In at least one embodiment, edge detector 206 utilizes this trained model in conjunction with an input image frame to produce an edge map, which accurately identifies boundaries of objects within an image frame, while generating a relatively weak response to text or object surface texture. Thus, in one or more embodiments and regardless of the edge detection method, edge detector 206 receives an image frame as input, and in return, outputs an edge map representing detected object boundaries within the image frame utilizing one or more of the techniques described above.

For example, as shown in FIG. 3A, system 202 provides camera viewfinder GUI 304 on a touch screen display 302 of a mobile computing device 300 (e.g., mobile computing device 106 as shown in FIGS. 1 and 2). As further shown in FIG. 3A, camera viewfinder GUI 304 includes an image feed showing displayed document 306. In one or more embodiments, edge detector 206 receives an image frame from the image feed for presentation within camera viewfinder GUI 304, and generates an edge map representing the edges within the image frame. For example, as shown in FIG. 3B, in at least one embodiment, edge detector 206 can provide edge map 308 for display within camera viewfinder GUI 304.

It is noted that FIGS. 3A-6G illustrate various features and functions within a display screen of mobile computer device 300. Often, however, the system 202 does not actually present the illustrated features and functions described with respect to these figures, rather, many of FIGS. 3A-6G are referred to for explanation purposes and are not intended to require a presentation of a respective described feature or function. For example, with respect to edge map 308, system 202 does not cause a presentation of edge map 308 within GUI 304.

As further shown in FIG. 3B, edge map 308 indicates all edges within the image frame shown in camera viewfinder GUI 304, regardless of whether each line is curved or straight (e.g., the curved corners of the mobile device near the top of the GUI 304. Accordingly, and referring again to FIG. 2, robust detection manager 204 also includes line identifier 208. In one or more embodiments, and in response to edge detector 206 generating an edge map, line identifier 208 identifies lines within the detected edges in an image frame. In at least one embodiment, system 202 operates under a heuristic that physical documents, and thus displayed documents, are generally rectangular with straight edges or boundary lines. Accordingly, line identifier 208 identifies straight lines in an image frame utilizing the edge map generated by edge detector 206.

In at least one embodiment, line identifier 208 utilizes the Hough Transform technique to find lines within an image frame. For example, in order to utilize the Hough Transform technique, line identifier 208 represents every line in an image space (e.g., the edge map) with the linear equation "Y=AX+B," where A is the slope of the line and B is the intercept. Utilizing the Hough Transform technique, line identifier 208 uses A and B to form a coordinate system, also known as the Hough space.

Figure 4A:
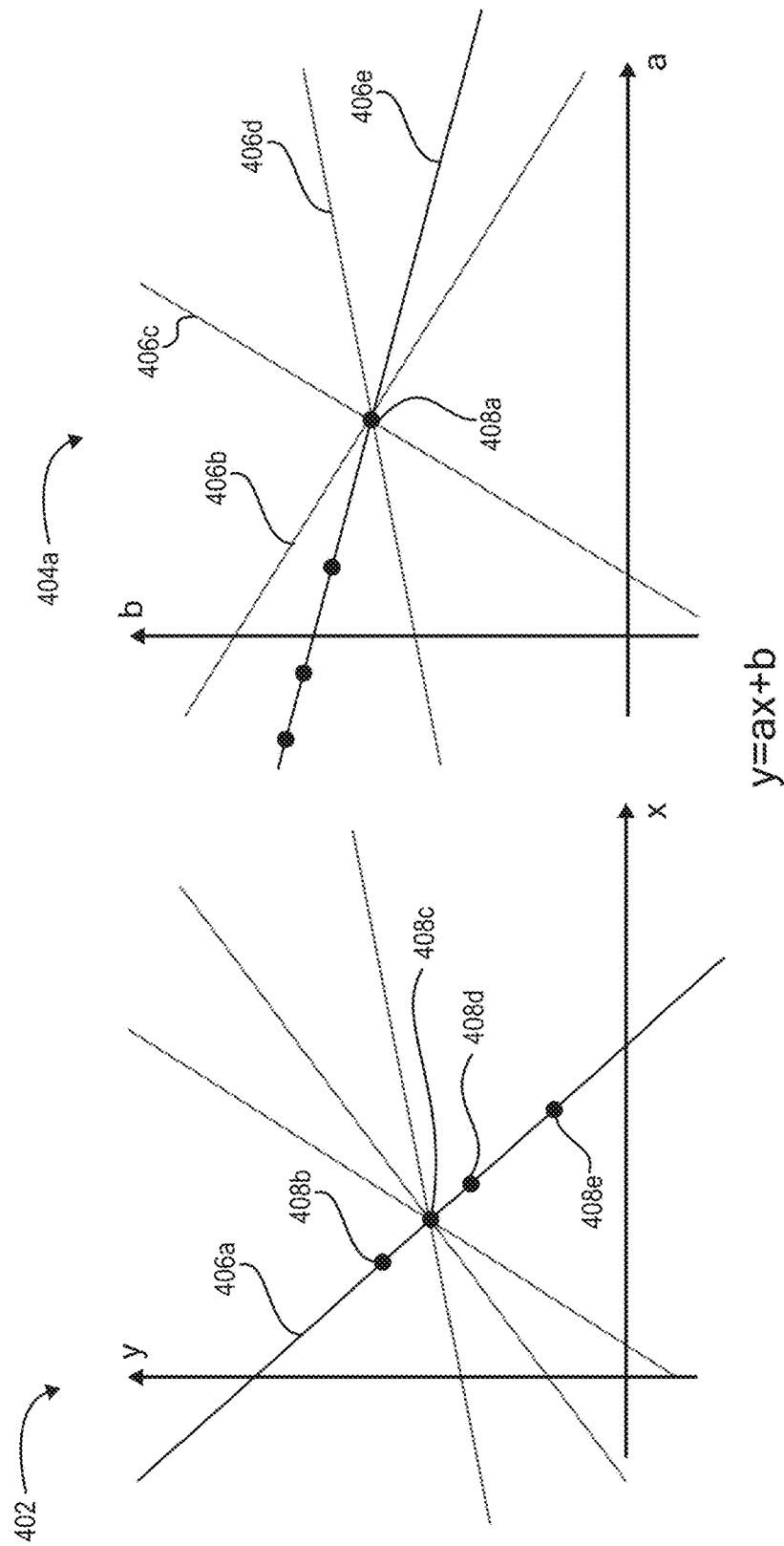
FIGS. 4A-4D illustrate a process for identifying one or more lines within an edge map in accordance with one or more embodiments described herein.

To illustrate, as shown in FIG. 4A, line identifier 208 represents a collection of lines and points including lines and points in image space 402. As further shown in FIG. 4A, each line in image space 402 corresponds to a point in the Hough space 404a. For example, line 406a in image space 402 corresponds to point 408a in Hough space 404a. Conversely, point 408b in image space 402 corresponds to line 406a in Hough space 404a. It follows that additional points 408c, 408d, and 408e along line 406a in image space 402 correspond to additional lines 406c, 406d, and 406e in Hough space 404a that intersect at the same point 408a. Thus, an alternate representation to "Y=AX+B" for the representation of the line can be "r=x cos θ−y sin θ."

Figures 4B, 4C:
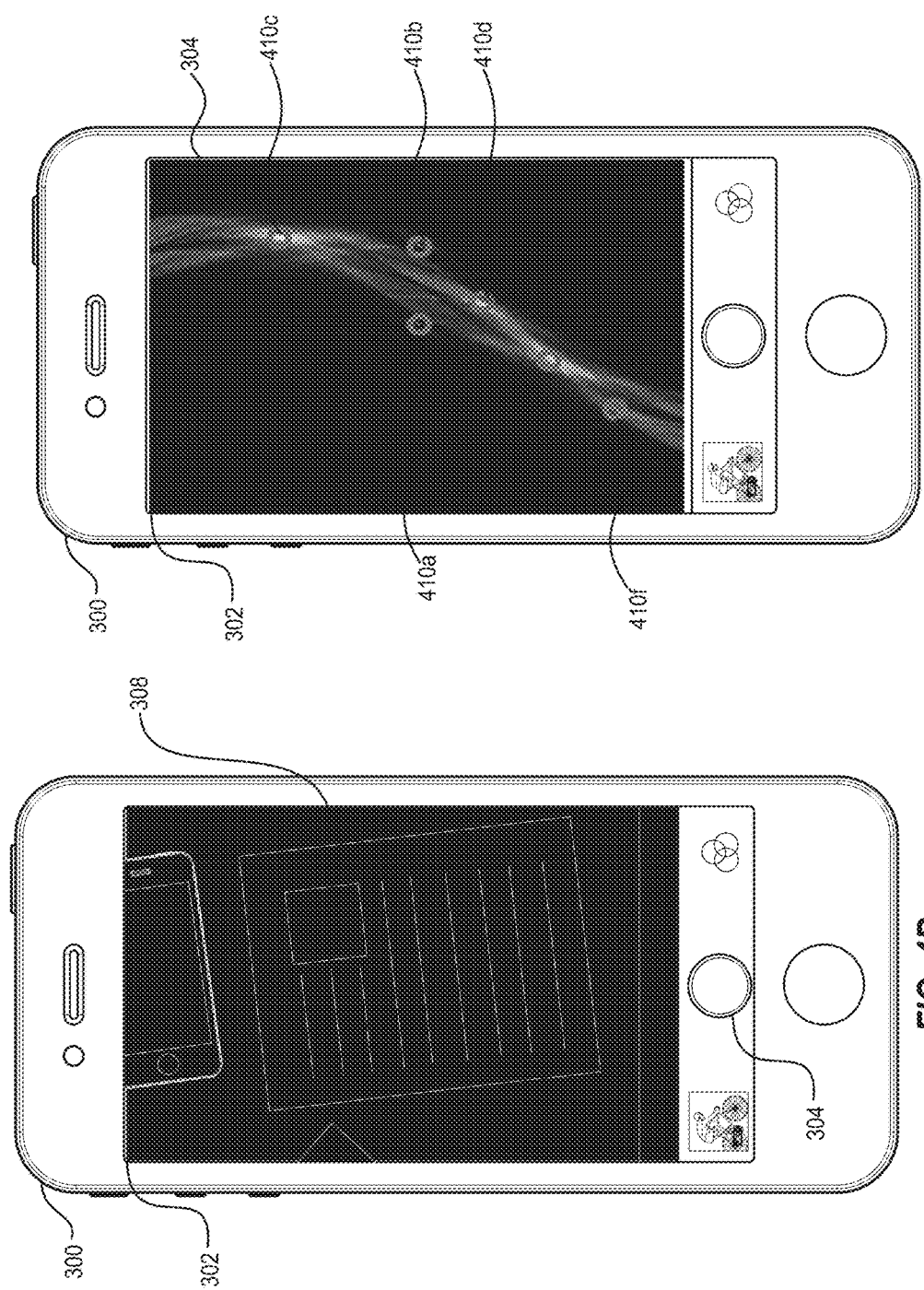

In applying the Hough Transform technique in order to find lines in an edge map, line identifier 208 applies the Hough Transformation to every point in the edge map. Line identifier 208 then adds all these points together in the Hough space. As illustrated in FIGS. 4B and 4C, in one or more embodiments, line identifier 208 finds the lines in edge map 308 by identifying all maxima 410a-410f (or local maxima) in Hough space 404b, as shown in FIG. 4C. Put another way, each line in edge map 308 supports possible lines in the Hough space 404b. When line identifier 208 adds the support from each line in the edge map 308 together, straight lines (e.g., likely displayed document boundaries) accumulate the most support at one or more maxima in the Hough space 404b.

Figure 4D:
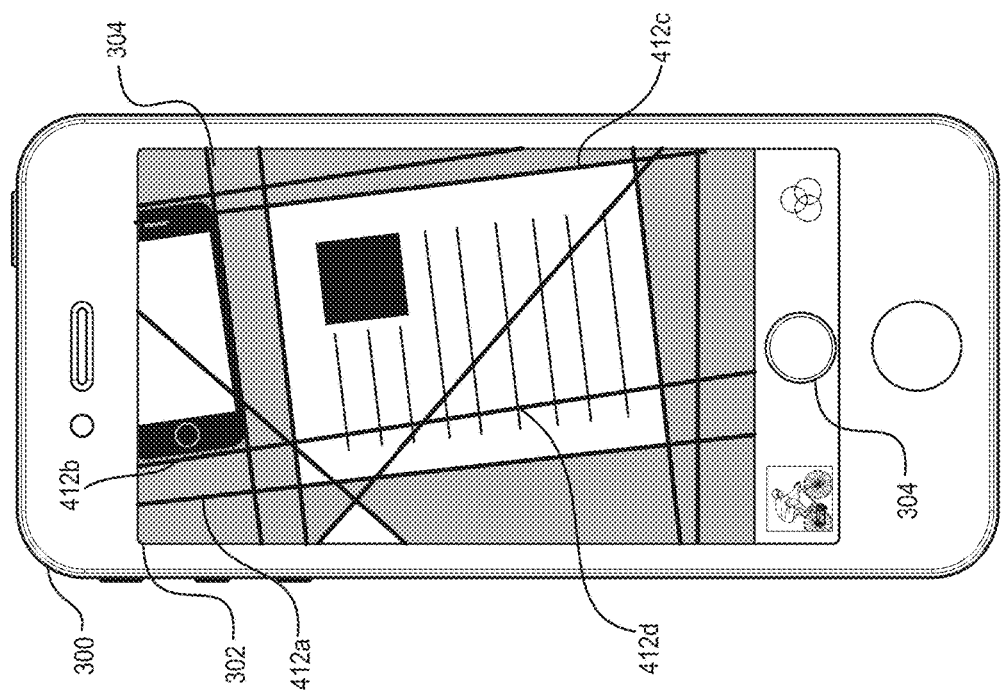

Next, line identifier 208 maps all points representing maxima or local maxima within the Hough space back into the image space. Thus, in one or more embodiments, line identifier 208 generates an updated edge map identifying straight lines. In at least one embodiment, line identifier 208 overlays line indicators on the image frame used by edge detector 206 to generate the edge map. For example, as shown in FIG. 4D, line identifier 208 overlays line indicators including line indicators 412a, 412b, 412c, and 412d on the image frame to indicate each identified line within the image frame. It is noted that the Hough Transformation technique results in straight lines, rather than line segments (e.g., there is no indication yet as to where each line begins and ends). It will be also understood based on the disclosure herein that while line identifier 208 is described in this embodiment as utilizing the Hough Transformation technique, in other embodiments, line identifier 208 can utilize any suitable technique to identify straight lines in an image frame.

Referring again to FIG. 2, robust detection manager 204 further includes corner identifier 210. In one or more embodiments, corner identifier 210 identifies intersections among identified lines in an image frame that may be corners of a displayed document. For example, as mentioned above line identifier 208 does not identify where a line begins and ends in an image frame. Accordingly, corner identifier 210 finds corners within the image frame (e.g., the intersections of the identified lines) in order to remove lines that are not important (e.g., likely not boundaries of the displayed document).

In one or more embodiments, corner identifier 210 utilizes geometric constraints to rule out corners that cannot be a displayed document boundary, or are unlikely to be a displayed document boundary, while leaving the corners that could possibly be a displayed document boundary. For example, corner identifier 210 utilizes geometric constraints including, but not limited to, <if the intersection of two lines creates very acute angle (e.g., less than acute angle threshold), then intersection is not a corner of the document> or <if the intersection of two lines creates a very obtuse angle (e.g., greater than obtuse angle threshold), then intersection is not a corner of the document>. Other geometric constraints can include line length, line length relative to other lines of image frame, number of line intersections, number of relative line intersections, ending points of a line, number of total lines of the image frame, instances of perpendicular and/or parallel lines with respect to a given line, and other geometric constraints.

To illustrate, and as depicted in FIG. 5A, corner identifier 210 overlays corners as indicated by corner indicators 502a-502f in combination with line indicators 412a-412d associated with the image frame from the image feed. As also shown in FIG. 5A, based on corner identifier 210 determining corners that satisfy the various geometric constraints, corner identifier 210 eliminates line indicators that are not associated with any of the identified corners, but rather, only provides line indicators that are associated with one or more identified corners.

Figure 5B:
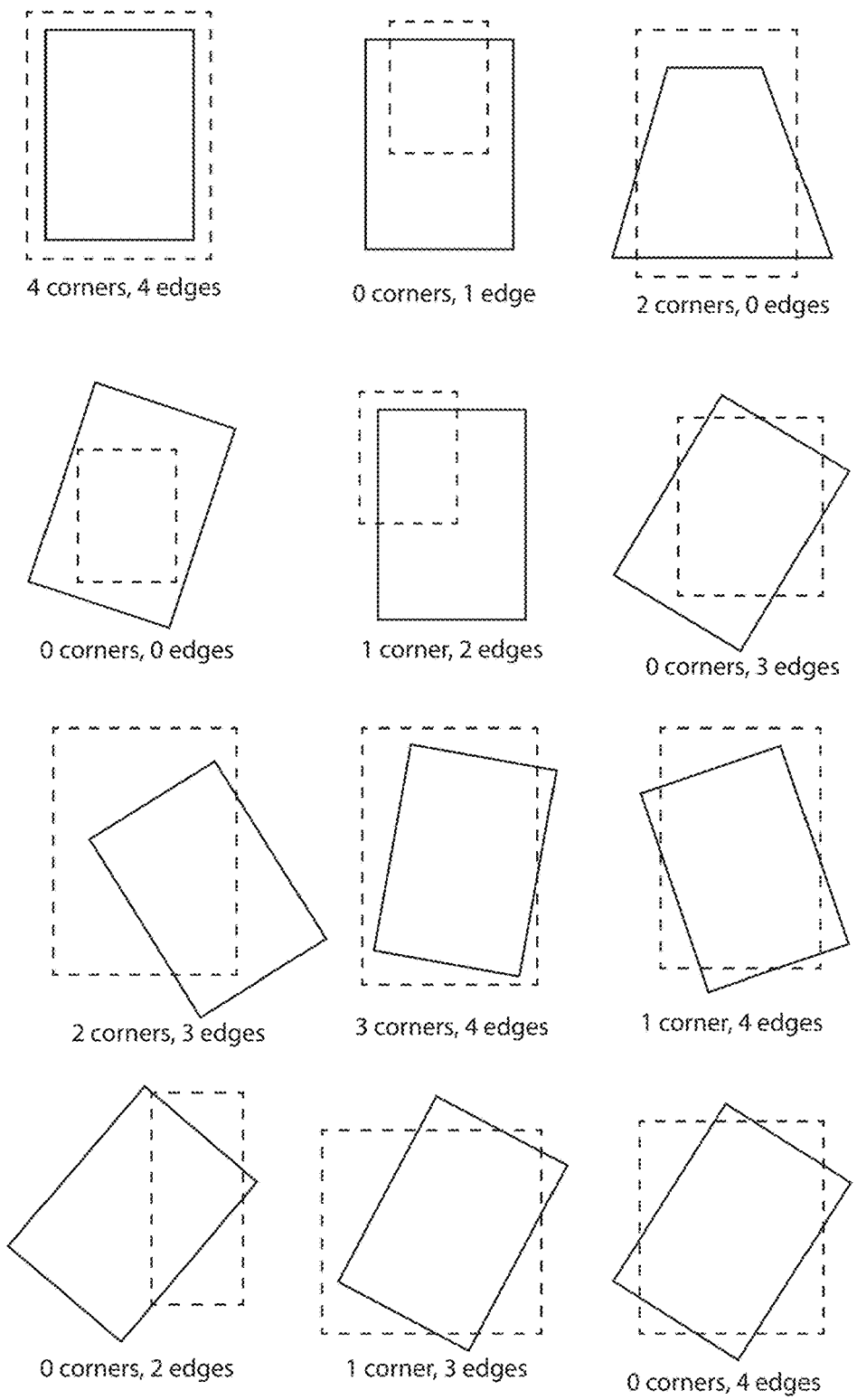

In one or more embodiments, corner identifier 210 further identifies corners that are outside the image frame. For example, as shown in FIG. 5B, there are many scenarios where one or more corners of a displayed document (as indicated by the solid-line quadrilaterals) may be outside an image frame (as indicated by the dashed-line quadrilaterals) due to the angle and/or positioning of the camera 226 relative to the physical document. In particular, FIG. 5B illustrates that a depending an angle, orientation, and camera position, an image frame can include various combinations of edges and corners of a display document. For example, an image frame can include combinations of edges and corners, respectively, ranging from (4, 4), (0, 4), and (4, 0), and all possible combinations of edges and corners as illustrated in FIG. 5B.

Figure 5D:
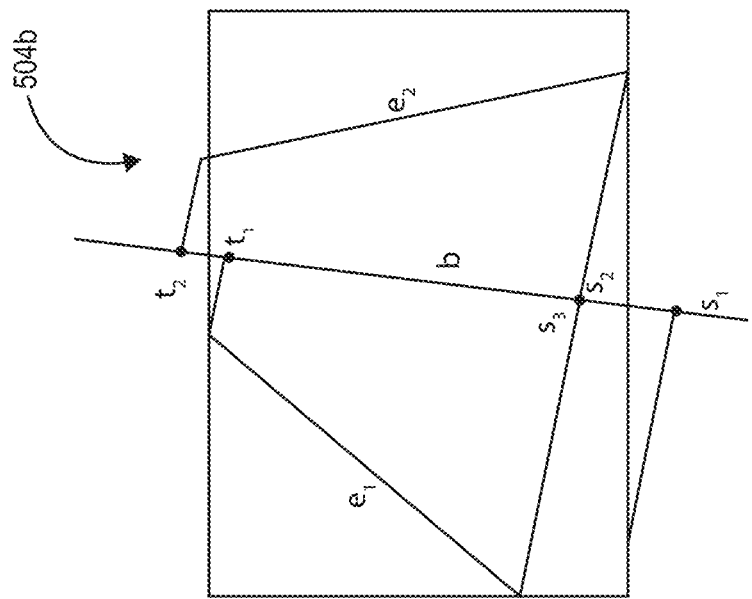
Figure 5C:
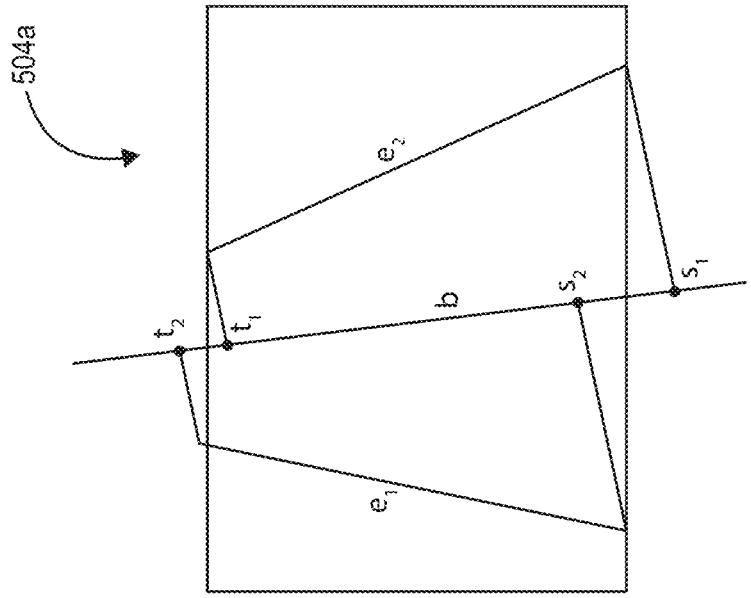

To illustrate how corner identifier 210 identifies one or more corners outside an image frame, FIGS. 5C and 5D show diagrams 504a and 504b representing an image frame including a displayed document from different angles, orientation, and/or camera position. As shown in FIGS. 5C and 5D, the displayed document has edges "e1" and "e2." For example, to identify one or more corners of the displayed document, corner identifier 210 computes a bisector "b" of the displayed document, given the edges "e1" and "e2." Next, corner identifier 210 computes the projections (e.g., "s1," "s2," "t1," and "t2") of the endpoints of the edges "e1" and "e2" onto the bisector "b," along with the projection of any image corner that is within the displayed document (e.g., the projection "s3" shown in FIG. 5D).

Next, the corner identifier 210 determines or approximates the height and width of the displayed document. In at least one embodiment, corner identifier 210 determines that the extreme points of these projections (e.g., "s1" and "t2") identify or approximate the height of the displayed document. In particular, with respect to FIG. 5C, the height is the distance between points "s1" and "t2" along bisector "b."

To determine the width of the displayed document, corner identifier 210 computes the distance between the bisector "b" and lines "e1" and "e2" corresponding to the endpoint projections "s1, "s2," "t1," and "t2," respectively. Using these distances, corner identifier determines the average of the smallest distance and the largest distance between bisector "b" and lines "e1" and "e2" corresponding to the endpoint projections "s1, "s2," "t1," and "t2," respectively. Corner identifier 210 takes the result of this computation as the width of the displayed document.

With the height and width of the displayed document now defined, corner identifier 210 identifies the coordinates of the corners of the displayed document outside the image frame. For example, the corner identifier 210 assigns point "s1" as the bottom of the displayed document, and point "t2" as the top of the document. Furthermore, for instance, the corner identifier 210 uses the determined width of the displayed document to determine corner points projected out from the bisector "b." The intersection of lines "e1" and "e2" with the projected corner points result in the identification or approximation of displayed document corners that are located outside of the image frame.

Referring again to FIG. 2, document identification system 202 includes quadrilateral engine 212. In one or more embodiments, quadrilateral engine 212 identifies quadrilaterals among the identified lines and identified corners within an image frame or associated with an image frame (e.g., identified corners outside of an image frame). As mentioned above, the underlying heuristic utilized by quadrilateral engine 212 is that a document has four sides, and is thus a quadrilateral. Accordingly, using the identified lines and corners within the image frame, quadrilateral engine 212 iterates through all possible four-sided quadrilaterals represented among the identified lines and identified corners to identify all quadrilaterals within the image frame.

In some embodiments, the quadrilateral engine 212 generates a score for each identified quadrilateral that indicates a likelihood that the identified quadrilateral represents the boundary of the displayed document in the image frame. In at least one embodiment, quadrilateral engine 212 calculates a score for a quadrilateral by computing an integral along the perimeter of the quadrilateral in the edge map. The highest scoring quadrilateral will be the one that has the maximum response in the edge map. Accordingly, quadrilateral engine 212 marks the highest scoring quadrilateral as representing the boundary of the displayed document in the image frame.

Figure 6A:
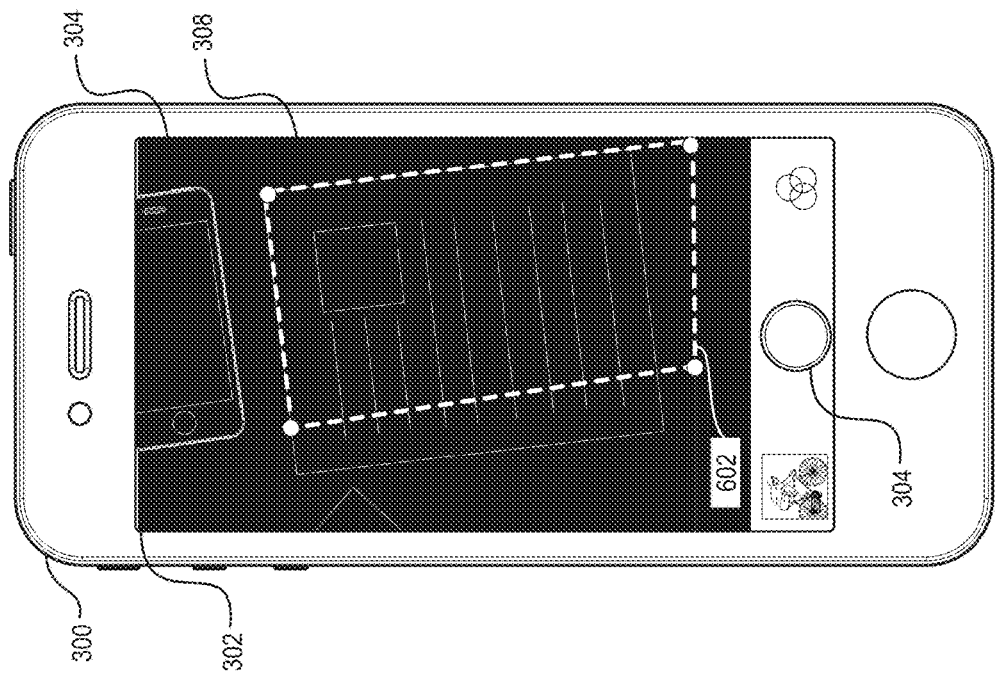
Figure 6B:
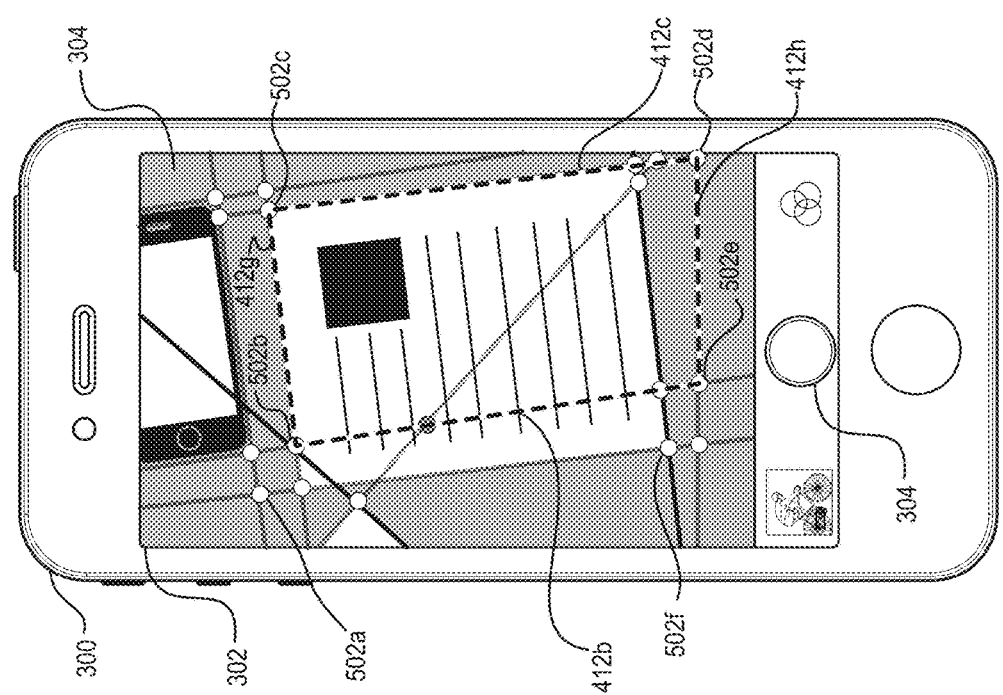

For example, as shown in FIGS. 6A-6F, quadrilateral engine 212 shows identified possible quadrilaterals for purposes of explanation. To illustrate, as shown in FIG. 6A, quadrilateral engine 212 identifies a quadrilateral including corner indicators 502c, 502d, 502k, and 502l, and line indicators 412b, 412c, 412g, and 412h. Accordingly, as shown in FIG. 6B, quadrilateral engine 212 provides identifies a potential display document boundary 602 based on the quadrilateral indicated in FIG. 6A.

In another iteration, as shown in FIG. 6C, quadrilateral engine 212 identifies a quadrilateral including corner indicators 502h, 502i, 502j, and 502k, and line indicators 412c, 412d, 412e, and 412f. Thus, as shown in FIG. 6D, quadrilateral engine 212 identifies a quadrilateral that also represents a potential display document boundary 602 based on the quadrilateral indicated in FIG. 6C.

Figure 6E:
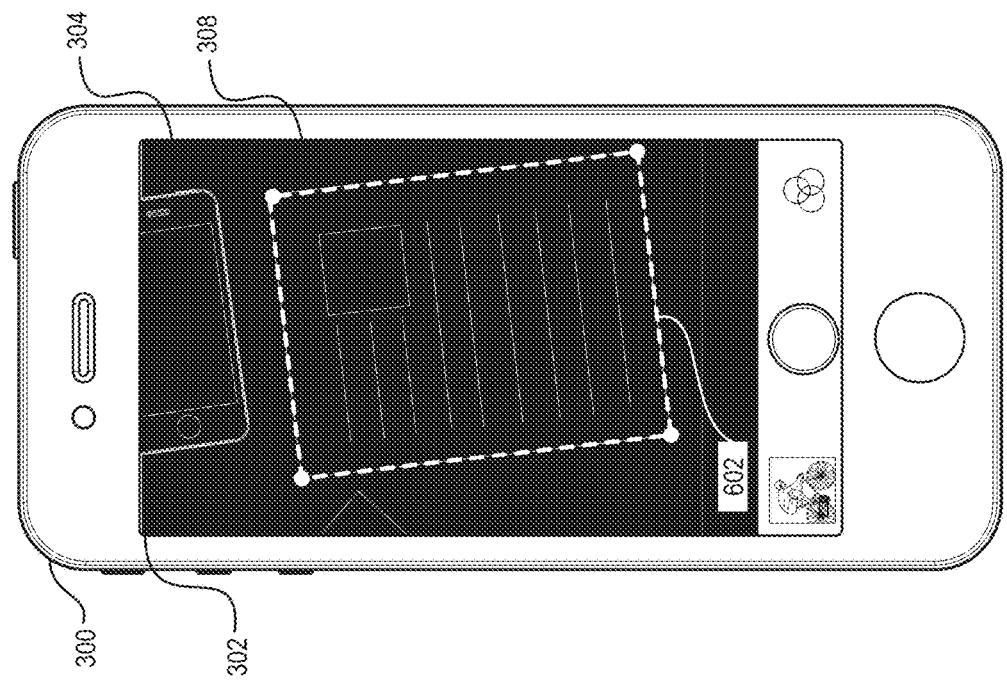
Figure 6F:
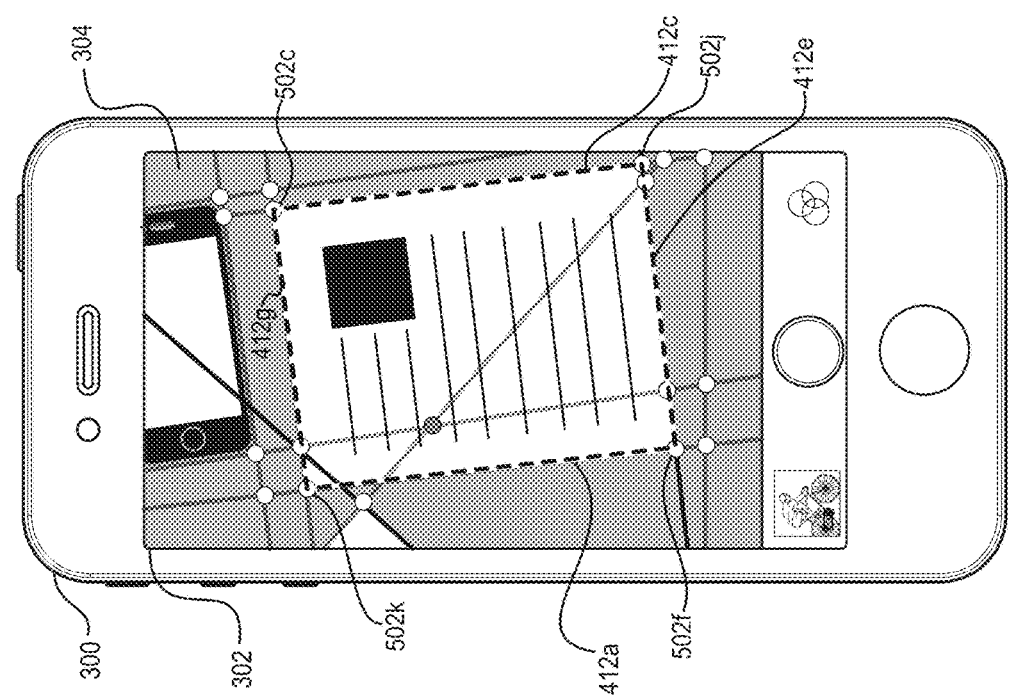

In yet another iteration, as shown in FIG. 6E, quadrilateral engine 212 identifies a quadrilateral including corner indicators 502c, 502f, 502j, and 502k, and line indicators 412a, 412c, 412e, and 412g. Thus, as shown in FIG. 6F, quadrilateral engine 212 identifies a quadrilateral that also represents a potential display document boundary 602 based on the quadrilateral indicated in FIG. 6E.

In at least one embodiment, quadrilateral engine 212 determines a highest-rated or highest-scored quadrilateral based on each identified quadrilateral. In at least one embodiment, after determining the highest-rated or highest-scored quadrilateral, the quadrilateral engine 212 performs a "micro-adjustment" to the highest-scored quadrilateral. For example, the micro-adjustment can include minor adjustments to the highest-scored quadrilateral to ensure that the edges of the hightest-scored quadrilateral aligns well with the displayed document edges.

The micro-adjustment can account for variances in resolution that may cause the Y=AX+B computation to be slightly inaccurate. For example, because of variances in resolution in both the robust and interactive processes, the numbers in Y=AX+B can be slightly inaccurate. Specifically, because pixels have integer coordinates, computing pixels from integer data might cause A and B to be slightly inaccurate (e.g., by subpixel). Accordingly, although a micro-adjustment step isn't strictly necessary, the micro-adjustment provides a quick method to improve the quality of the hightest-scored quadrilateral.

The quadrilateral engine 212 can then generate and provide a document boundary indicator corresponding to a displayed document boundary based on the highest scoring quadrilateral. For example, as shown in camera viewfinder GUI 304 in FIG. 6G, quadrilateral engine 212 can cause the system 202 to overlay displayed document boundary indicator 602 on displayed document 306 in response to determining displayed document boundary indicator 602 corresponds to the highest scoring quadrilateral associated with displayed document 306. Thus, the user is presented with a display that makes it readily apparent that system 202 has correctly identified a displayed document.

The functionality of edge detector 206, line identifier 208, corner identifier 210, and quadrilateral engine 212 is described above in connection with the robust detection process, wherein robust detection manager 204 analyzes a whole image frame in order to identify boundaries of a displayed document. In some embodiments, the robust detection process is computationally intensive, and thus requires more time to successfully identify displayed document boundaries. This can be problematic when the image frame capture rate for camera 226 of mobile computing device 106 is faster than the rate at which robust detection manager 204 can identify displayed document boundaries. From a user's perspective, this mismatch between camera 226 and robust detection manager 204 may lead to a lagged display of document boundaries with respect to image frames presented to a user from the image feed, as illustrated in FIG. 7A.

Figure 7A:
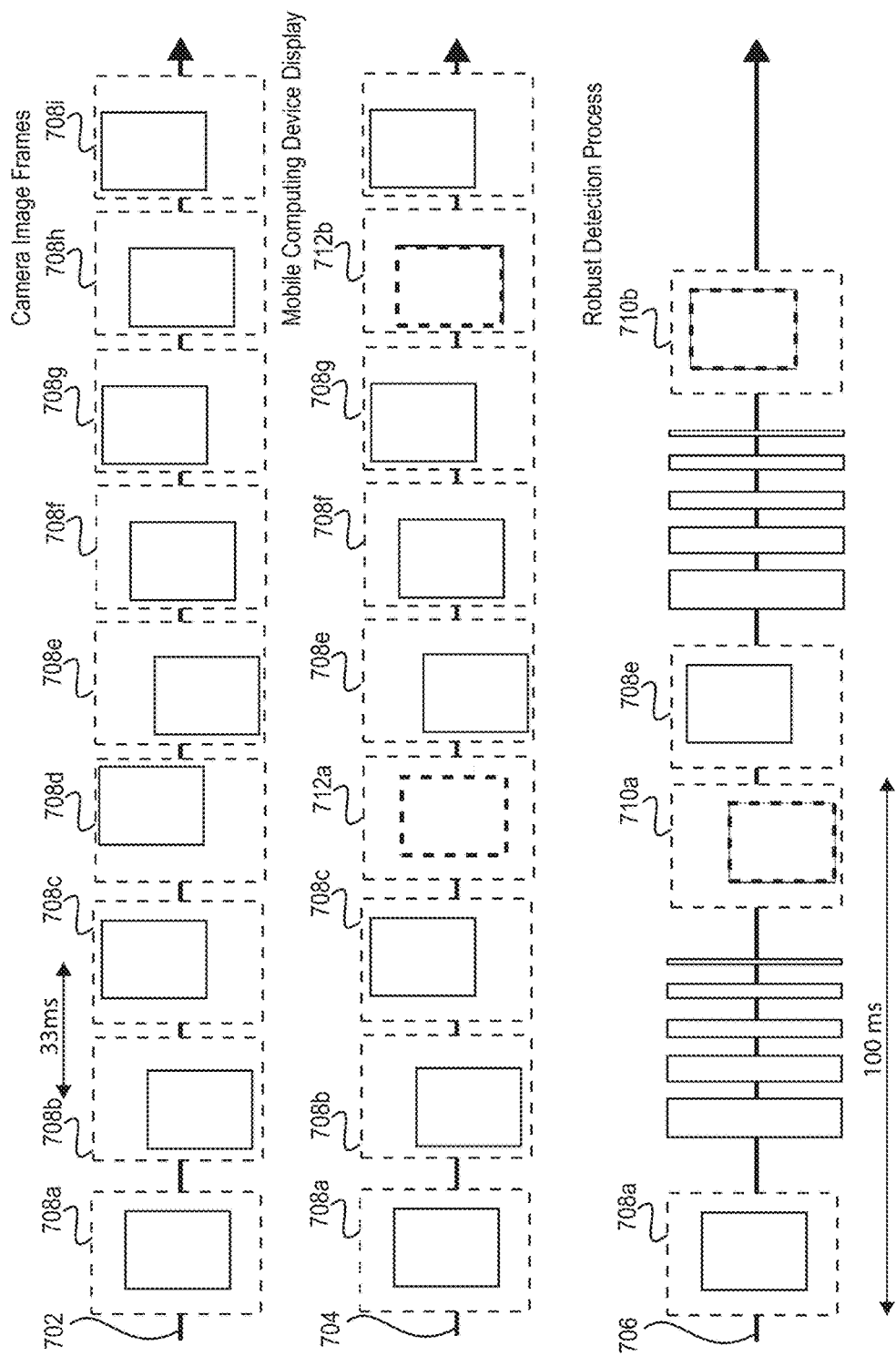
FIGS. 7A-7B illustrate a process for utilizing multiple document detection processes in parallel in accordance with one or more embodiments described herein.

For example, as shown in FIG. 7A, camera 226 provides an image feed along timeline 702 including image frames 708a-708i, where the frame rate of camera 226 is 33 milliseconds (e.g., camera 226 provides an image frame every 33 milliseconds). As further shown in FIG. 7A, the robust detection process operates along timeline 706, where it might take at least 100 milliseconds for robust detection manager 204 to complete the robust detection process in connection with image frame 708a and output a displayed document boundary overlay 710a. As further shown in FIG. 7A, mobile computing device display timeline 704 provides several image frames 708a, 708b, 708c before system 202 can provide a boundary indicator 712a overlaid a displayed document within an image frame. The actual time needed for the robust detection process and the interactive detection process can be longer or shorter depending on a particular application and/or hardware performance specifications.

Mobile computing device display timeline 704 includes several more image frames 708e, 708f, and 708g before system 202 provides the next display 712b of an image frame overlaid with a boundary indicator. Thus, if the user of mobile computing device 106 is watching a display of image frames as provided along mobile computing device display timeline 704, the displayed document boundary indicator would appear lagged, jerky, and likely inaccurate (e.g., the boundary indicator does not align with a displayed document).

In order to overcome this problem, and as explained above, system 202 utilizes various processes in parallel to ensure that a boundary indicator is generated with adequate speed for presentation within an image feed. For example, and returning to FIG. 2, document identification system 202 includes iterative detection manager 214. In one or more embodiments, iterative detection manager 214 identifies the boundaries of a displayed document through an iterative detection process. As used herein, an "iterative detection process" refers to a method of identifying displayed document boundaries that utilizes a previous location of the displayed document boundaries and various movement signals from mobile computing device 106 to predict an updated location of the displayed document boundaries.

For example, as shown in FIG. 2, iterative detection manager 214 includes signal manager 216 and displayed document location manager 218. In one or more embodiments, signal manager 216 receives various movement signals from mobile computing device 106. For instance, signal manager 216 receives movement signals (e.g., indicating horizontal movement, vertical movement, tilt, rotation, etc.) from a gyroscope and/or accelerometer associated with mobile computing device 106. Additionally, signal manager 216 can receive movement signals from camera 226, a GPS unit associated with mobile computing device 106, a Wi-Fi unit associated with mobile computing device 106, and so forth. In one or more embodiments, signal manager 216 receives movement signals at the same rate or faster rate than the image rate of camera 226.

Next, as shown in FIG. 2, iterative detection manager 214 includes displayed document location manager 218. In one or more embodiments, iterative detection manager 214 utilizes movement signals received by signal manager 216 in connection a previous location of the boundaries of a displayed document (e.g., as identified by robust detection manager 204) in order to determine or predict an updated location of the boundaries of a displayed document in a current image frame. For example, in one or more embodiments, the iterative detection manager 214 uses the previous boundary location to perform a quick detection of an updated boundary based on detecting a same shape as the previous boundary within a threshold area around the previous boundary. Accordingly, using one or more device signals, and one or more characteristics from a previous boundary, the iterative detection manager 214 can determine an updated boundary location with respect to a displayed document.

Also as shown in FIG. 2, document identification system 202 includes document boundary display manager 220. In one or more embodiments, document boundary display manager 220 generates a display of document boundary indicators overlaid one or more image frames, where the document boundary indicators are provided by either robust detection manager 204 or iterative detection manager 214. For example, in at least one embodiment, the iterative detection process is much faster than the robust detection process. Accordingly, in one or more embodiments, in order to provide a smooth display of a displayed document boundary indicator, document identification system 202 operates the robust detection process and the iterative detection process in parallel. Accordingly, with both processes running in parallel, document boundary display manager 220 provides a displayed document boundary indicator in connection with every image frame, or almost every image frame in an image feed, such that displayed document detection appears to operate in real-time.

To illustrate the parallel processing described above, FIG. 7B includes a camera image frames and movement signals timeline 714, wherein camera 226 provides image frames 708a-708i at a frame rate of 33 milliseconds, and other sensors associated with mobile computing device 106 provide movement signals at the same rate. As indicated by robust detection process timeline 706, it takes robust detection manager 204 at least 100 milliseconds to generate displayed document boundary overlay 710a based on image frame 708a.

Figure 7B:
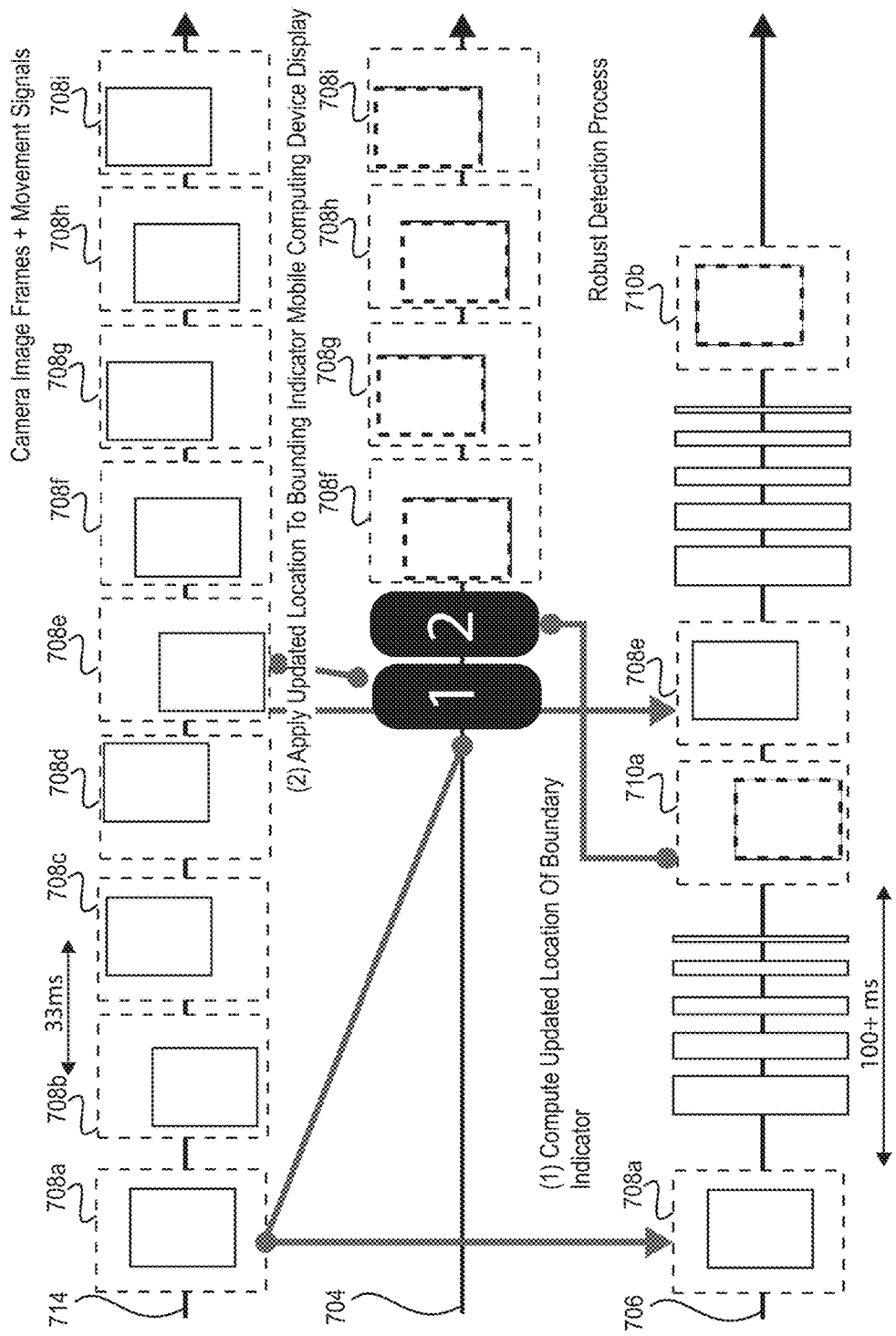

Once robust detection manager 204 determines the location of the displayed document boundary (as provided in displayed document boundary overlay 710a), iterative detection manager 214 begins the faster iterative detection process, as shown in mobile computing device display timeline 704. For example, as shown in FIG. 7B, iterative detection manager 214 utilizes the location of the displayed document boundary in displayed document boundary overlay 710a, and computes an updated location of the displayed document boundary utilizing movement signals received in connection with image frame 708e. Thus, document boundary display manager 220 can display the updated location of the displayed document boundary in connection with the very next image frame 708f. Iterative detection manager 214 continues computing an updated location of the displayed document boundary in this way (e.g., as shown in image frames 708g-708i along mobile computing device display timeline 704) until robust detection manager 204 provides the next displayed document boundary overlay 710b. Accordingly, document boundary display manager 220 can provide a displayed document boundary indicator in every displayed image frame.

In at least one embodiment, the iterative detection manager 214 performs a verification check on each displayed document boundary indicator to guard against potentially noisy measurements from one or more sensors (e.g., the gyroscope and/or accelerometer). For example, the iterative detection manager 214 may perform a verification check based on a verification score that represents the likelihood, based on the prior location of the displayed document boundary, that the current displayed document boundary is correct.

Referring again to FIG. 2, document identification system 202 also includes data storage 222. In one or more embodiments, data storage 222 stores displayed document data 224, which can include information related to displayed documents, displayed document boundaries, displayed document boundary indicators, and so forth, as described herein.

Furthermore, as described herein, and as shown in FIG. 2, mobile computing device 106 includes camera 226. In one or more embodiments, camera 226 can include one or more cameras associated with mobile computing device 106. For example mobile computing device can include a front-facing camera and/or a rear-facing camera. Furthermore, mobile computing device may be communicatively connected to a peripheral camera (e.g., via a physical connection or a network connection).

One or more embodiments described herein detect displayed documents in a live image feed. In additional or alternative embodiments, document identification system 202 can detect displayed documents in a single still image. For example, in at least one embodiment, document identification system 202 can detect a displayed document in a digital photograph stored on mobile computing device 106. For instance, in order to detect a displayed document in a digital photograph, document identification system 202 may utilize the robust detection process, as described above.

Additionally, in at least one embodiment, document identification system 202 can also detect displayed documents in digital photographs and video stored on a remote repository. For example, as shown in FIG. 2, mobile computing device 106 may be communicatively connected to server 102 hosting online content management system 104. As mentioned above, online content management system 104 includes content item repository 228 including content item data 230. For example, the user of mobile computing device 106 may have an account with online content management system 104 allowing the user to store digital photographs and videos as content item data 230. Accordingly, in one embodiment, online content management system application 108 can enable mobile computing device 106 to access and download one or more content items (e.g., digital photographs and videos) for document identification system 202 to utilize for one or more of the displayed document processes described herein.

As mentioned above, and as will be described in more detail below, system 202 can facilitate, generate, or otherwise provide one or more graphical user interfaces. For example, system 202 can allow a user to interact with a collection of display elements for a variety of purposes. In particular, FIGS. 8A, 8B, and 8C and the description that follows illustrate various example embodiments of the user interfaces and features in accordance with general principles as described above.

Figure 8A:
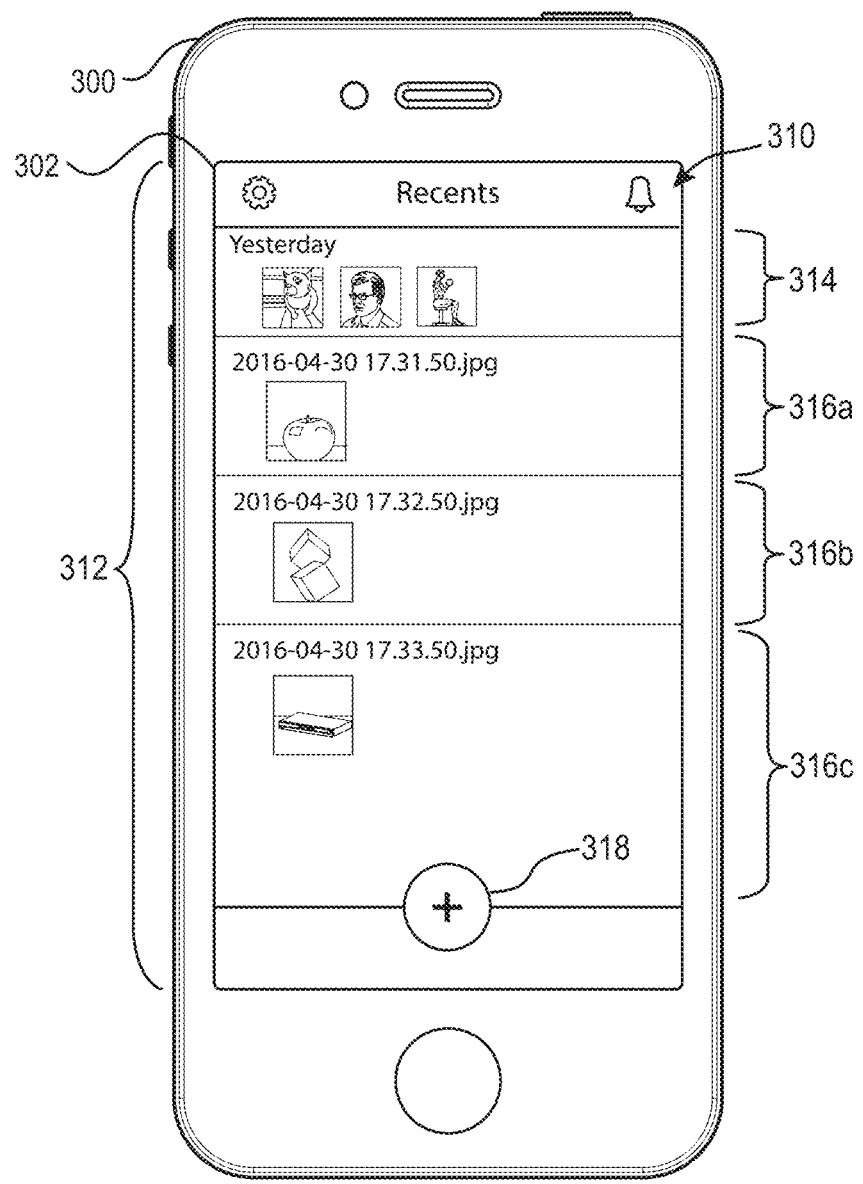
FIGS. 8A-8C illustrate a series of graphical user interfaces showing a boundary indicator corresponding to a displayed document in an image feed in accordance with one or more embodiments described herein.
Figure 8C:
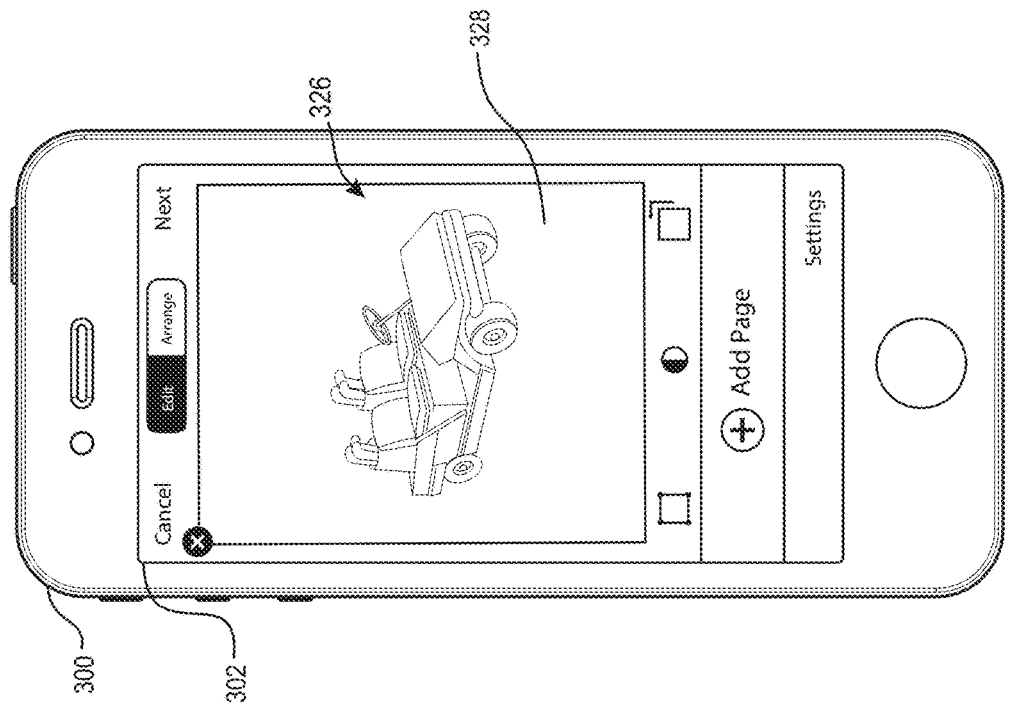

For example, system 200 (e.g., via content storage system application 108) causes computing device to present a content item listing GUI 310 of online content management system application 108 on touch screen display 302. As used herein, a "touch screen display" refers to the display of a touch screen device. In one or more embodiments, a touch screen device may be a computing device with at least one surface upon which a user may perform touch gestures (e.g., a laptop, a tablet computer, a media player, a mobile phone). Additionally, or alternatively, mobile computing device 300 may include any other suitable input device, such as a touch pad, mouse, keyboard, or those described below in reference to FIGS. 10 and 11. As shown in FIG. 8A, system 202 provides content item listing 312 and recent content item preview 314 within content item listing GUI 310.

In one or more embodiments, content item listing 312 includes content item objects 316a, 316b, and 316c. Each content item object 316a-316c is an interactive display object that includes various additional elements. For example, as shown in FIG. 8A, content item objects 316a-316c each include a title and a thumbnail preview. In one or more embodiments, in response to receiving a selection of one of content item objects 316a-316c, system 202 can provide additional graphical user interfaces that enable the user to inspect, edit, share, and save the content items associated with each of the content item objects 316a-316c.

Figure 8B:
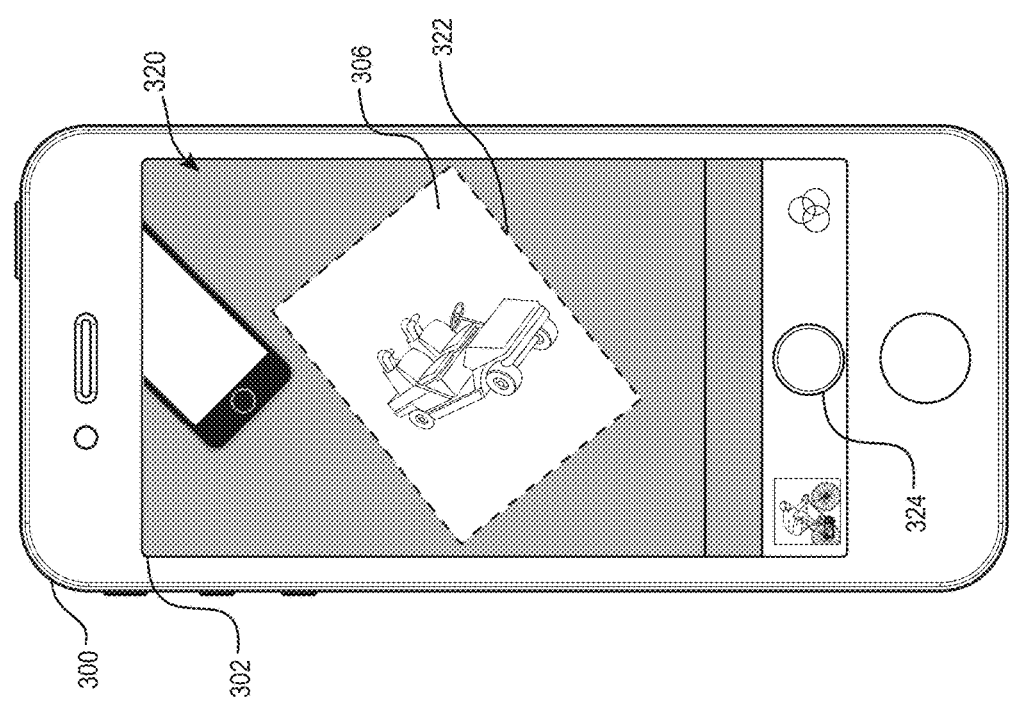

Furthermore, as shown in FIG. 8A, content item listing GUI 310 includes new content item control 318. In one or more embodiments, in response to receiving a selection of new content item control 318, online content management system application 108 provides camera viewfinder GUI 320, as shown on touch screen display 302 of mobile computing device 300 in FIG. 8B. For example, in one or more embodiments, camera viewfinder GUI 320 includes a display of the image feed provided by a camera associated with mobile computing device 300 (e.g., camera 226). As shown in FIG. 8B, camera viewfinder GUI 320 also includes capture button 324. Thus, in response to detecting a selection of capture button 324, online content management system application 108 creates a digital file containing an image frame taken from the displayed image feed.

As discussed above, system 202 performs real-time displayed document identification in connection with an image feed. Accordingly, as shown in FIG. 8B, system 202 detects displayed document 306 and overlays displayed document boundary indicator 322 on the image feed displayed in camera viewfinder GUI 320. Although displayed document boundary indicator 322 is shown herein as a highlighted outline, in one or more alternative embodiments, displayed document boundary indicator 322 can be any type of visual indicator. Alternatively, displayed document boundary indicator 322 may be a shape sized to fit over the displayed document 306, or may include an animation (e.g., a flashing line, a moving dashed line, etc.). As described above, even when the user moves mobile computing device 300, such that displayed document 306 is not stationary within the image feed, system 202 performs various types of document detection processes in parallel such that system 202 can provide displayed document boundary indicator 322 in real-time or near-real time.

In response to a selection of capture button 324, online content management system application 108 captures a digital image including an image frame taken from the image feed displayed in camera viewfinder GUI 320. After capturing the digital image, online content management system application 108 can process the digital image in various ways in order to enhance the digital image (e.g., correct colors, remove shadows, rectify the boundaries, etc.). Additionally, in at least one embodiment, online content management system application 108 can convert the digital image into one of various other file formats. For example, as shown in document preview GUI 326 on touch screen display 302 of mobile computing device 300 in FIG. 8C, online content management system application 108 can provide a preview 328 of the enhanced and rectified digital image taken of displayed document 306. From document preview GUI 326, the user of mobile computing device 300 can then can convert the digital image into a portable document format (e.g., PDF) file, or into another type of file format.

Figure 9:
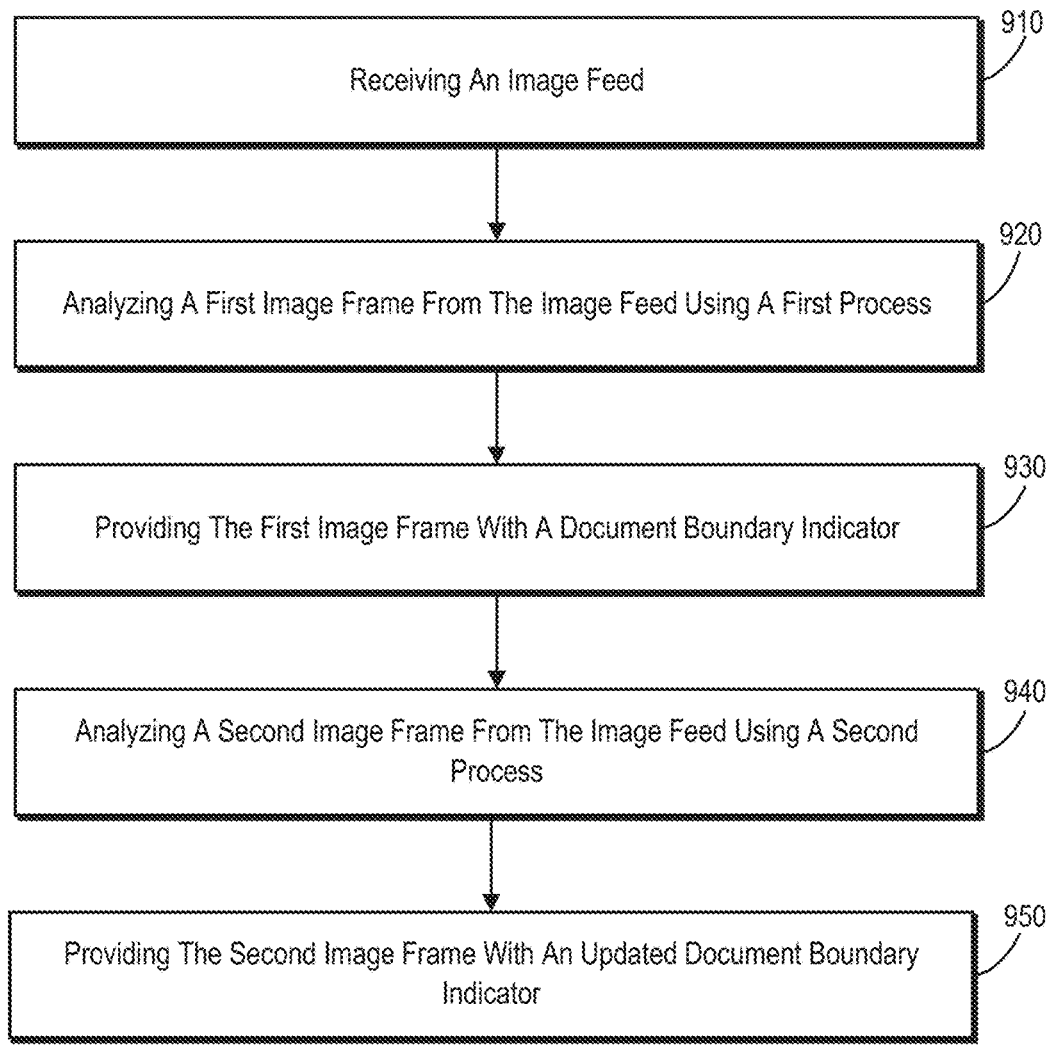
FIG. 9 illustrates a flowchart of a series of acts in a method of detecting a displayed document in an image feed in accordance with one or more embodiments described herein.

FIGS. 1-8C, the corresponding text, and the examples, provide a number of different systems and devices for detecting a displayed document in an image feed. In addition to the foregoing, embodiments of the present disclosure can also be described in terms of flowcharts comprising acts and steps in a method for accomplishing a particular result. For example, FIG. 9 illustrates a flowchart of exemplary methods in accordance with one or more embodiments of the present disclosure. The methods described in relation to FIG. 9 may be performed with less or more steps/acts or the steps/acts may be performed in differing orders. Additionally, the steps/acts described herein may be repeated or performed in parallel with one another or in parallel with different instances of the same or similar steps/acts.

FIG. 9 illustrates a flowchart of one example method 900 of detecting a displayed document in an image feed. The method 900 includes an act 910 of receiving an image feed. In particular, act 910 can involve receiving an image feed comprising a displayed document. For example, in one or more embodiments, receiving the image feed includes receiving the image feed from a camera associated with a mobile computing device.

Furthermore, method 900 includes an act 920 of analyzing a first image frame from the image feed using a first process. In particular, act 920 can involve analyzing a first image frame from the image feed using a first process to determine a boundary of the displayed document. For example, in one or more embodiments, analyzing the first image frame using the first process comprises analyzing the first image frame using a robust detection process.

In at least one embodiment, analyzing the first image frame using the robust detection process includes generating an edge map representing a plurality of edges within the first image frame; identifying, based the edge map, a plurality of edges and corners within the first image frame; and determining one or more quadrilaterals formed from the identified plurality of edges and corners. Additionally, in at least one embodiment, method 900 includes acts of analyzing the one or more quadrilaterals to assign a score to each of the one or more quadrilaterals; and wherein determining the boundary of the displayed document is based on identifying a quadrilateral from the one or more quadrilaterals that is associated with the highest score.

Method 900 also includes an act 930 of providing the first image frame with a document boundary indicator. In particular, act 930 can involve providing, for presentation to a user, the first image frame with a document boundary indicator based on the determined boundary of the displayed document. For example, in one or more embodiments, providing the first image frame with a document boundary indicator includes overlaying the document boundary indicator over the first image frame such that the document boundary indicator follows the boundaries of the displayed document.

Additionally, method 900 includes an act 940 of analyzing a second image frame from the image feed using a second process. In particular, act 940 can involve analyzing, based on the determined boundary of the displayed document in the first image frame, a second image frame from the image feed using a second process to determine an updated boundary of the displayed document. For example, in one or more embodiments, analyzing the second image frame using the second process includes analyzing the second image frame using an iterative detection process. In at least one embodiment, analyzing the second image frame using the iterative detection process includes receiving one or more signals associated with a mobile computing device; and predicting, based on the received one or more signals, the updated boundary of the displayed document Additionally, in at least one embodiment, receiving one or more signals associated with the mobile computing device includes receiving one or more signals from the mobile computing device indicating movement of the mobile computing device. Furthermore, in at least one embodiment, predicting the updated boundary of the displayed document includes determining a movement of the mobile computing device based on the one or more signals; modifying a location of the boundary of the display document in the first image frame based on the determined movement of the mobile computing device; and applying the modified location to the second image frame.

Moreover, method 900 includes an act 950 of providing the second image frame with an updated document boundary indicator. In particular, act 950 can involve providing, for presentation to the user, the second image frame with an updated document boundary indicator based on the determined updated boundary of the displayed document overlaid on the second image frame. For example, in at least one embodiment, the first image frame and the second image frame are presented in order such that the displayed document boundary indicator is continuously displayed in connection with the displayed document.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
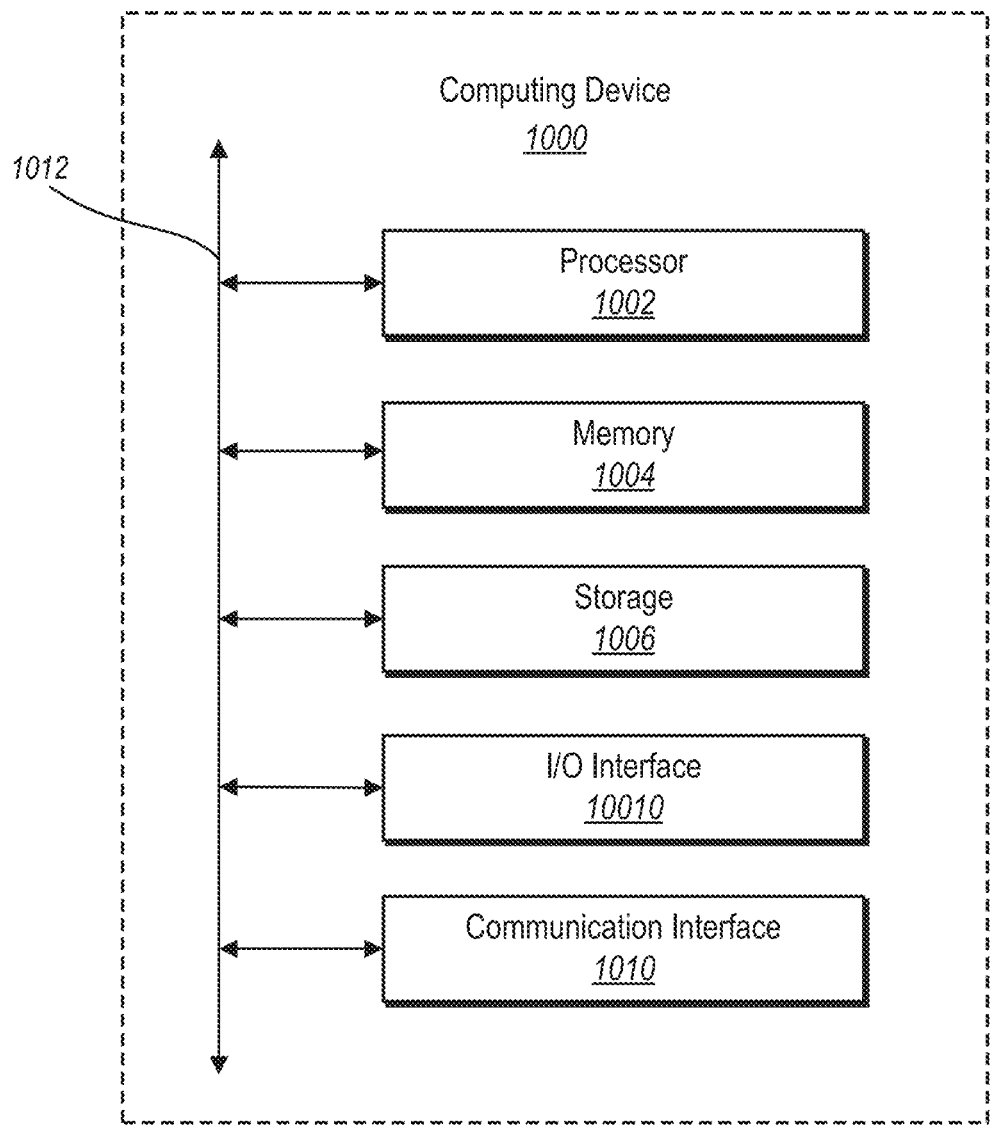
FIG. 10 illustrates a block diagram of an exemplary computing device in accordance with one or more embodiments described herein.

FIG. 10 illustrates a block diagram of exemplary computing device 1000 that may be configured to perform one or more of the processes described above. One will appreciate that one or more computing devices such as computing device 1000 may implement communication environment 100 and online content management system application 108. As shown by FIG. 10, computing device 1000 can comprise processor 1002, memory 1004, storage device 1006, I/O interface 1008, and communication interface 1010, which may be communicatively coupled by way of communication infrastructure 1012. While an exemplary computing device 1000 is shown in FIG. 10, the components illustrated in FIG. 10 are not intended to be limiting. Additional or alternative components may be used in other embodiments. Furthermore, in certain embodiments, computing device 1000 can include fewer components than those shown in FIG. 10. Components of computing device 1000 shown in FIG. 10 will now be described in additional detail.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage device 1006 and decode and execute them. In particular embodiments, processor 1002 may include one or more internal caches for data, instructions, or addresses. As an example and not by way of limitation, processor 1002 may include one or more instruction caches, one or more data caches, and one or more translation lookaside buffers ("TLBs"). Instructions in the instruction caches may be copies of instructions in memory 1004 or storage 1006.

Memory 1004 may be used for storing data, metadata, and programs for execution by the processor(s). Memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1004 may be internal or distributed memory.

Storage device 1006 includes storage for storing data or instructions. As an example and not by way of limitation, storage device 1006 can comprise a non-transitory storage medium described above. Storage device 1006 may include a hard disk drive ("HDD"), a floppy disk drive, flash memory, an optical disc, a magneto-optical disc, magnetic tape, or a Universal Serial Bus ("USB") drive or a combination of two or more of these. Storage device 1006 may include removable or non-removable (or fixed) media, where appropriate. Storage device 1006 may be internal or external to computing device 1000. In particular embodiments, storage device 1006 is non-volatile, solid-state memory. In other embodiments, Storage device 1006 includes read-only memory ("ROM"). Where appropriate, this ROM may be mask programmed ROM, programmable ROM ("PROM"), erasable PROM ("EPROM"), electrically erasable PROM ("EEPROM"), electrically alterable ROM ("EAROM"), or flash memory or a combination of two or more of these.

I/O interface 1008 allows a user to provide input to, receive output from, and otherwise transfer data to and receive data from computing device 1000. I/O interface 1008 may include a mouse, a keypad or a keyboard, a touch screen, a camera, an optical scanner, network interface, modem, other known I/O devices or a combination of such I/O interfaces. I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 1008 is configured to provide graphical data to a display for presentation to a user. The graphical data may be representative of one or more graphical user interfaces and/or any other graphical content as may serve a particular implementation.

Communication interface 1010 can include hardware, software, or both. In any event, communication interface 1010 can provide one or more interfaces for communication (such as, for example, packet-based communication) between computing device 1000 and one or more other computing devices or networks. As an example and not by way of limitation, communication interface 1010 may include a network interface controller ("NIC") or network adapter for communicating with an Ethernet or other wire-based network or a wireless NIC ("WNIC") or wireless adapter for communicating with a wireless network, such as a WI-FI.

Additionally or alternatively, communication interface 1010 may facilitate communications with an ad hoc network, a personal area network ("PAN"), a local area network ("LAN"), a wide area network ("WAN"), a metropolitan area network ("MAN"), or one or more portions of the Internet or a combination of two or more of these. One or more portions of one or more of these networks may be wired or wireless. As an example, communication interface 1010 may facilitate communications with a wireless PAN ("WPAN") (such as, for example, a BLUETOOTH WPAN), a WI-FI network, a WI-MAX network, a cellular telephone network (such as, for example, a Global System for Mobile Communications ("GSM") network), or other suitable wireless network or a combination thereof.

Additionally, communication interface 1010 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1012 may include hardware, software, or both that couples components of computing device 1000 to each other. As an example and not by way of limitation, communication infrastructure 1012 may include an Accelerated Graphics Port ("AGP") or other graphics bus, an Enhanced Industry Standard Architecture ("EISA") bus, a front-side bus ("F SB"), a HYPERTRANSPORT ("HT") interconnect, an Industry Standard Architecture ("ISA") bus, an INFINIBAND interconnect, a low-pin-count ("LPC") bus, a memory bus, a Micro Channel Architecture ("MCA") bus, a Peripheral Component Interconnect ("PCI") bus, a PCI-Express ("PCIe") bus, a serial advanced technology attachment ("SATA") bus, a Video Electronics Standards Association local ("VLB") bus, or another suitable bus or a combination thereof.

Figure 11:
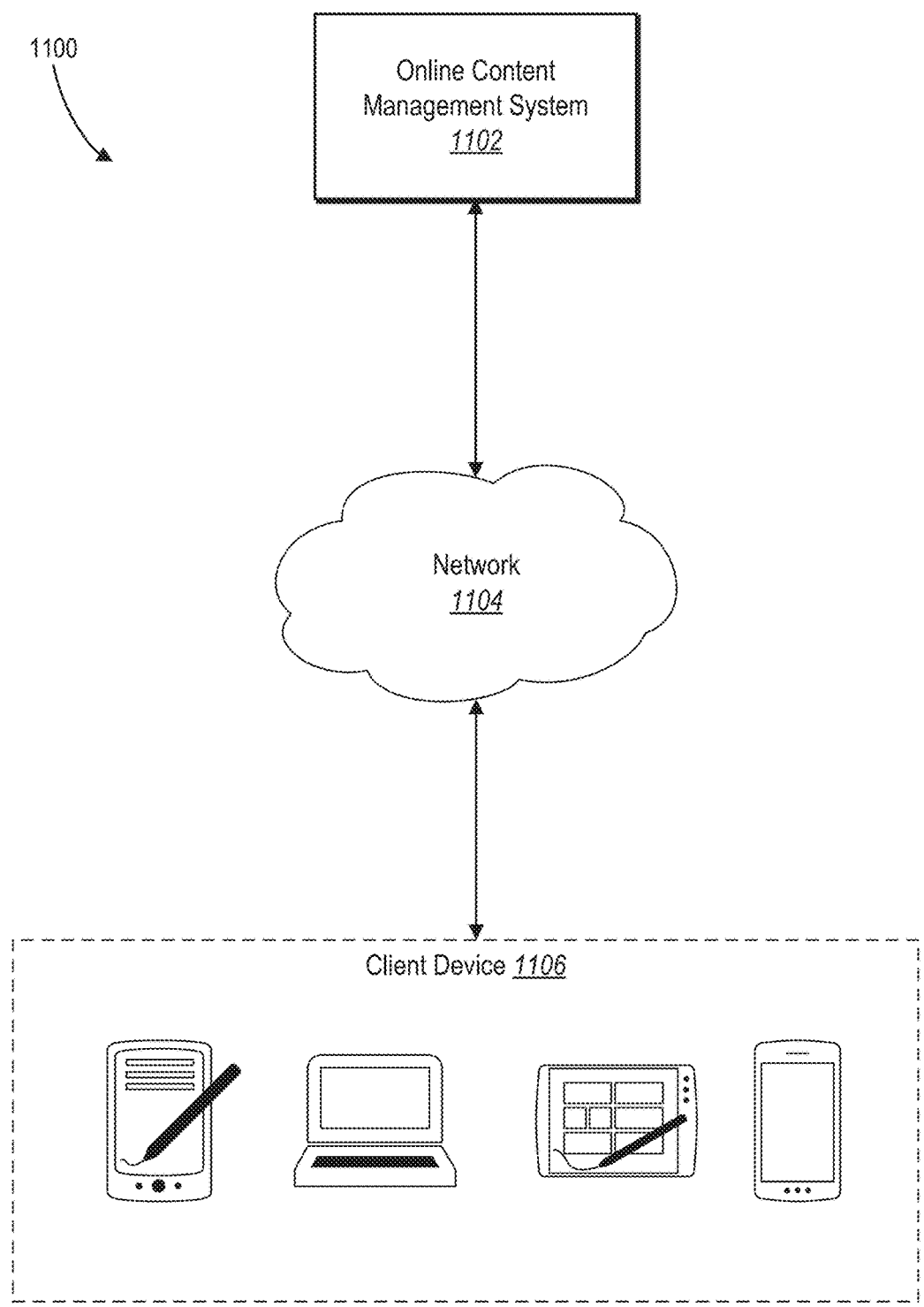
FIG. 11 is an example network environment of a social network management system in accordance with one or more embodiments described herein.

FIG. 11 is a schematic diagram illustrating an online content management system 1102 (e.g., online content management system 104 as shown in FIG. 1) that can work in conjunction with communication environment 100. Online content management system 1102 may generate, store, manage, receive, and send digital content items (e.g., digital photographs, digital documents, etc.). For example, online content management system 1102 may send and receive electronic documents to and from client devices 1106 by way of network 1104. In particular, online content management system 1102 can store and manage a collection of content items. Online content management system 1102 can manage the sharing of content items between computing devices associated with a plurality of users. For instance, online content management system 1102 can facilitate a user sharing a content item with another user of the communication environment 100 and online content management system 104.

In particular, online content management system 1102 can manage synchronizing content items across multiple client devices 1106 associated with one or more users. For example, user may edit a content item using client devices 1106. The online content management system 1102 can cause client device 1106 to send the edited content item to online content management system 1102. Online content management system 1102 then synchronizes the edited content item on one or more additional computing devices.

In addition to synchronizing content items across multiple devices, one or more embodiments of the online content management system 1102 can provide an efficient storage option for users that have large collections (e.g., galleries) of content items. For example, the online content management system 1102 can store a collection of content items, while the client device 1106 only stores reduced-sized versions of the content items. A user can navigate and browse the reduced-sized versions (e.g., eBook cover art) of the content items on client device 1106. In particular, one way in which a user can experience content items is to browse the reduced-sized versions of the content items on client device 1106. Online content management system 1102 may store any number of reduced size versions (e.g., thumbnails) of digital content items and provide them to client device 1106 at a suitable time (e.g., to allow client device 1106 to emphasize one or more digital content items within a graphical user interface).

Client device 1106 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 1106 may execute one or more client applications, such as a web browser (e.g., Microsoft Windows Internet Explorer, Mozilla Firefox, Apple Safari, Google Chrome, Opera, etc.) or a native or special-purpose client application (e.g., Application for iPhone or iPad or for Android, etc.), to access and view content over network 1104.

Network 1104 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1106 may access online content management system 1102.

Online content management system 1102 may also include social network components such as a social network management system. A social network management system may generate, store, manage, receive, and send social network communications. For example, the social network management system may send and receive social network communications to and from client devices 1106 by way of network 1104. In particular, the social network management system can store and manage one or more social network communications sent between co-users of a social network. The social network management system can manage the sharing of social network communications between computing devices associated with a plurality of users. For instance, the social network management system can facilitate a user sharing a social network communication with another user of communication environment 100.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A method comprising:
receiving an image feed comprising a displayed document;
analyzing, by at least one processor, a first image frame from the image feed using a first process to determine a boundary of the displayed document;
providing, for presentation on a display of a client computing device, the first image frame with a document boundary indicator corresponding to the boundary of the displayed document;
analyzing, based on the boundary of the displayed document in the first image frame and in parallel with the first process, a second image frame from the image feed using a second process to determine an updated boundary of the displayed document; and
providing, for presentation on the display of the client computing device, the second image frame with an updated document boundary indicator corresponding to the updated boundary of the displayed document.

2. The method as recited in claim 1, wherein receiving the image feed comprises receiving the image feed from a camera associated with the client computing device.

3. The method as recited in claim 1, wherein analyzing the first image frame using the first process comprises analyzing the first image frame using a robust detection process.

4. The method as recited in claim 3, wherein analyzing the first image frame using the robust detection process comprises:
generating an edge map comprising edges identified within the first image frame;
identifying, based the edge map, a plurality of edges and a plurality of corners within the first image frame; and
determining one or more quadrilaterals formed from the plurality of edges and the plurality of corners.

5. The method as recited in claim 4, further comprising:
analyzing the one or more quadrilaterals to assign a score to each of the one or more quadrilaterals; and
wherein determining the boundary of the displayed document is based on identifying a quadrilateral from the one or more quadrilaterals that is associated with the highest score.

6. The method as recited in claim 1, wherein analyzing the second image frame using the second process comprises analyzing the second image frame using an iterative detection process.

7. The method as recited in claim 6, wherein analyzing the second image frame using the iterative detection process comprises:
receiving one or more signals associated with a mobile computing device; and
predicting, based on the received one or more signals, the updated boundary of the displayed document.

8. The method as recited in claim 7, wherein receiving one or more signals associated with the mobile computing device comprises receiving at least one signal indicating movement of the mobile computing device.

9. The method as recited in claim 7, wherein predicting the updated boundary of the displayed document comprises:
determining a movement of the mobile computing device based on the one or more signals;
modifying a location of the boundary of the display document in the first image frame based on the determined movement of the mobile computing device; and
applying the modified location to the second image frame.

10. A mobile computing device comprising:
at least one processor; and
at least one non-transitory computer-readable storage medium storing instructions thereon that, when executed by the at least one processor, cause the mobile computing device to:
receive an image feed comprising a displayed document;
analyze a first image frame from the image feed using a first process to determine a boundary of the displayed document;
provide, for presentation on a display of the mobile computing device, the first image frame with a document boundary indicator corresponding to the boundary of the displayed document;
analyze, based on the boundary of the displayed document in the first image frame and in parallel with the first process, a second image frame from the image feed using a second process to determine an updated boundary of the displayed document; and
provide, for presentation on the display of the mobile computing device, the second image frame with an updated document boundary indicator corresponding to the updated boundary of the displayed document overlaid on the second image frame.

11. The mobile computing device as recited in claim 10, wherein receiving the image feed comprises receiving the image feed from a camera associated with the mobile computing device.

12. The mobile computing device as recited in claim 11, wherein analyzing the first image frame using the first process comprises analyzing the first image frame using a robust detection process comprising:
generating an edge map comprising edges within the first image frame;
identifying, based the edge map, a plurality of edges and a plurality of corners within the first image frame; and
determining one or more quadrilaterals formed from the plurality of edges and the plurality of corners.

13. The mobile computing device as recited in claim 12, wherein the non-transitory computer-readable storage medium further stores instructions that, when executed by the at least one processor, cause the mobile computing device to:
analyze the one or more quadrilaterals to assign a score to each of the one or more quadrilaterals; and
wherein determining the boundary of the displayed document is based on identifying a quadrilateral from the one or more quadrilaterals that is associated with the highest score.

14. The mobile computing device as recited in claim 13, wherein analyzing the second image frame using the second process comprises analyzing the second image frame using an iterative detection process.

15. The mobile computing device as recited in claim 14, wherein analyzing the second image frame using the iterative detection process comprises receiving one or more signals indicating movement of the mobile computing device.

16. The mobile computing device as recited in claim 15, further comprising generating a predicted location of the displayed document within the second image frame based on the received one or more signals.

17. The mobile computing device as recited in claim 16, wherein determining the updated boundary of the displayed document within the second image frame is based in part on the predicted location of the displayed document within the second image frame.

18. A non-transitory computer-readable medium storing instructions thereon that, when executed by at least one processor, cause a computer system to:
- receive an image feed comprising a displayed document;
- analyze a first image frame from the image feed using a first process to determine a boundary of the displayed document;
- provide, for presentation on a display of a client computing device, the first image frame with a document boundary indicator based on the boundary of the displayed document;
- analyze, based on the boundary of the displayed document in the first image frame and in parallel with the first process, a second image frame from the image feed using a second process to determine an updated boundary of the displayed document; and
- provide, for presentation on the display of the client computing device, the second image frame with an updated document boundary indicator based on the updated boundary of the displayed document.

19. The non-transitory computer-readable medium as recited in claim 18, wherein:
- providing the document boundary indicator for presentation on the display of the client computing device comprises overlaying the document boundary indicator on the first image frame; and
- providing the updated document boundary indicator for presentation on the display of the client computing device comprises overlaying the updated document boundary indicator on the second image frame.

20. The non-transitory computer-readable medium as recited in claim 18, wherein:
- analyzing the first image frame using the first process comprises performing a robust displayed document search within the entire first image frame to identify the boundary of the displayed document; and
- analyzing the second image frame using the second process comprises performing an iterative detection process to predict an updated location of the displayed document within the second image frame to identify the updated boundary of the display document.

* * * * *